(12) United States Patent
Ishiyama

(10) Patent No.: US 10,747,666 B2
(45) Date of Patent: Aug. 18, 2020

(54) MEMORY SYSTEM

(71) Applicant: Toshiba Memory Corporation, Tokyo (JP)

(72) Inventor: Masahiro Ishiyama, Kawasaki Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 15 days.

(21) Appl. No.: 15/795,222

(22) Filed: Oct. 26, 2017

(65) Prior Publication Data
US 2018/0121354 A1    May 3, 2018

(30) Foreign Application Priority Data

Oct. 27, 2016 (JP) .................. 2016-210551

(51) Int. Cl.
| | | |
|---|---|---|
| G06F 12/08 | (2016.01) | |
| G06F 12/0804 | (2016.01) | |
| G06F 12/0868 | (2016.01) | |
| G06F 12/02 | (2006.01) | |
| G06F 3/06 | (2006.01) | |
| G06F 12/1009 | (2016.01) | |

(52) U.S. Cl.
CPC ......... *G06F 12/0804* (2013.01); *G06F 3/068* (2013.01); *G06F 3/0616* (2013.01); *G06F 3/0647* (2013.01); *G06F 3/0656* (2013.01); *G06F 12/0246* (2013.01); *G06F 12/0868* (2013.01); *G06F 12/1009* (2013.01); *G06F 2212/1024* (2013.01); *G06F 2212/1036* (2013.01); *G06F 2212/205* (2013.01)

(58) Field of Classification Search
CPC ........... G06F 3/0616; G06F 2212/1036; G06F 3/0656; G06F 12/1009; G06F 3/0647; G06F 3/068; G06F 12/0804; G06F 2212/1024; G06F 2212/205; G06F 12/0246; G06F 12/0868

USPC ........................................ 711/103
See application file for complete search history.

(56) References Cited

U.S. PATENT DOCUMENTS 8,327,065 B2    12/2012 Yano et al.
8,745,443 B2    6/2014 Hirao et al.
(Continued)

FOREIGN PATENT DOCUMENTS

JP    2010157133 A    7/2010
JP    2012128643 A    7/2012

OTHER PUBLICATIONS

A. Sweeney, D. Doucette, W. Hu, C. Anderson, M. Nishimoto, and C. Peck, Scalability in the XFS File System. In USENIX 1996, San Diego, CA, Jan. 1996.
(Continued)

*Primary Examiner* — Hua J Song
(74) *Attorney, Agent, or Firm* — Kim & Stewart LLP

(57) ABSTRACT

A memory system includes a non-volatile memory, a buffer memory, and a controller. The controller is configured to write data corresponding to a write command received from a host in the buffer memory, and based on an indication from the host, do not write the data stored in the buffer memory into the non-volatile memory unless a non-volatilization event occurs, the non-volatilization event being one of a flush request from the host and a detection of a power shutdown.

18 Claims, 18 Drawing Sheets

(56) References Cited

U.S. PATENT DOCUMENTS

| | | | |
|---|---|---|---|
| 8,918,560 B2* | 12/2014 | Nishikawa | G11C 7/10 710/52 |
| 8,959,280 B2 | 2/2015 | Yu et al. | |
| 2008/0123485 A1* | 5/2008 | Terasaki | G11B 20/10 369/47.5 |
| 2015/0106556 A1* | 4/2015 | Yu | G11C 16/349 711/103 |
| 2016/0266792 A1* | 9/2016 | Amaki | G06F 12/0246 |
| 2017/0351551 A1* | 12/2017 | Manhardt | G06F 9/5061 |

OTHER PUBLICATIONS

Viking Technology's ArxCis-NV TM.
"Storage in the DIMM Socket" Adrian Proctor; Shining Light on the DIMM Slot, 2014 Storage Networking Industry Association.

* cited by examiner

FIG. 14

| abp_id | START ADDRESS | REWRITABLE WINDOW SIZE | wh | rt | BUFFER POINTER |
|---|---|---|---|---|---|
| | | MANAGEMENT TABLE 33A | | | |
| 1 | 1000 | 4 | 3 | 0 | |

MEMORY SYSTEM

CROSS-REFERENCE TO RELATED APPLICATION

This application is based upon and claims the benefit of priority from Japanese Patent Application No. 2016-210551, filed Oct. 27, 2016, the entire contents of which are incorporated herein by reference.

FIELD

Embodiments described herein relate generally to a memory system including a non-volatile memory.

BACKGROUND

As one example of memory systems including a non-volatile memory, NAND flash technology-based solid-state drives (SSDs) are known. The SSDs are used as the main storage of various computing devices because of features such as high performance and low power consumption. The SSDs are also widely used in a storage server. However, NAND flash memory has an upper limit on write cycles.

DESCRIPTION OF THE DRAWINGS

FIG. 14 is a data structure diagram showing an example of a management table according to the second embodiment.

DETAILED DESCRIPTION

Embodiments provide a memory system that employs write suppression for prolonging the lifespan of a non-volatile memory.

In general, according to one embodiment, a memory system includes a non-volatile memory, a buffer memory, and a controller. The controller is configured to write data corresponding to a write command received from a host in the buffer memory, and based on an indication from the host, do not write the data stored in the buffer memory into the non-volatile memory unless a non-volatilization event occurs, the non-volatilization event being one of a flush request from the host and a detection of a power shutdown.

Hereinafter, embodiments will be described with reference to the drawings.

First Embodiment

Figure 1:
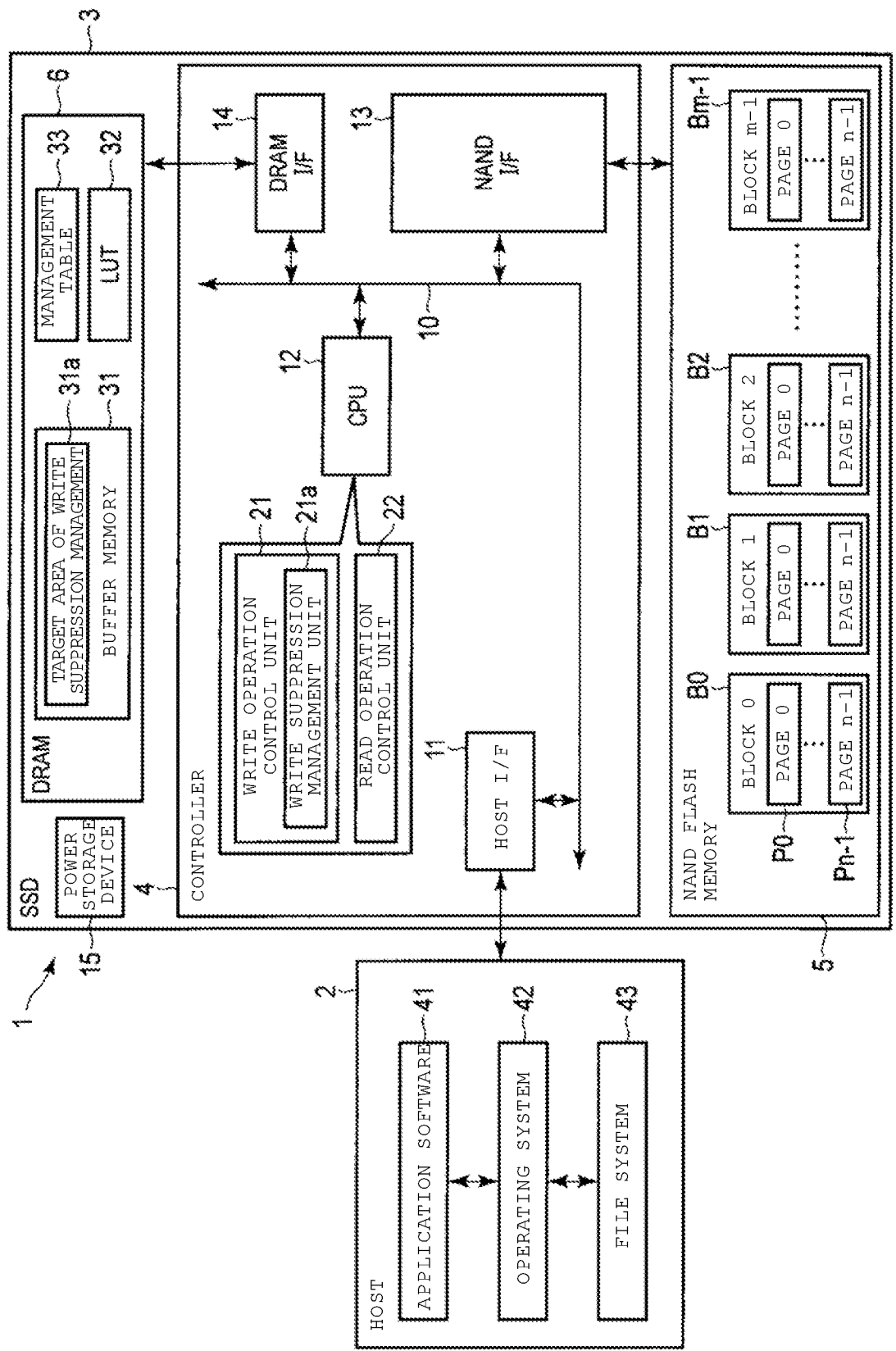
FIG. 1 is a block diagram showing a configuration example of an information processing system including a memory system according to a first embodiment.

FIG. 1 is a block diagram showing a configuration example of an information processing system including a memory system according to the present embodiment.

The memory system according to the present embodiment is a semiconductor storage device that is configured to write data in a non-volatile memory and read data from the non-volatile memory. For example, the memory system is realized as a NAND flash technology-based solid state drive (SSD) 3.

The information processing system 1 includes a host 2, and an SSD 3. The host 2 is an information processing device (e.g., computing device) that accesses the SSD 3. The host 2 may be a storage server that stores various data items in the SSD 3, or may be a personal computer.

The SSD 3 may be used as a main storage of the information processing device functioning as the host 2. The SSD 3 may be built in the information processing device, or may be connected to the information processing device through a cable or a network.

SCSI, Serial Attached SCSI (SAS), ATA, Serial ATA (SATA), PCI Express® (PCIe), Ethernet®, Fibre Channel, or NVM Express® (NVMe) may be used as an interface for connecting the host 2 and the SSD 3.

The SSD 3 includes a controller 4, a non-volatile memory (e.g., NAND flash memory) 5, a DRAM 6, and a power storage device 15. The SSD 3 may use another type of memory in place of the DRAM 6 as a buffer memory or a cache memory. For example, the SSD 3 may use, in place of the DRAM 6, a random-access memory which has access speeds faster than that of the NAND flash memory 5 and of which the upper limit of the number of times of write operations is larger than that of the NAND flash memory 5. Specifically, for example, magnetoresistive random access memory (MRAM) may be used in place of the DRAM 6. The DRAM may also be provided on the host 2.

The NAND flash memory 5 may include, but not limited to, a plurality of NAND flash memory chips. The NAND flash memory 5 includes a memory cell array. The memory cell array includes a plurality of NAND blocks B0 to Bm−1. The unit of a block represents an erasure unit. The blocks are also referred to as "physical blocks" or are simply referred to as "erase blocks".

The blocks B0 to Bm−1 include a plurality of physical pages. That is, each of the blocks B0 to Bm−1 includes pages P0 to Pn−1. In the NAND flash memory 5, the reading of data and the writing of data are performed on a per page basis. The erasing of data is performed on a per block basis.

The controller 4 is electrically connected to the NAND flash memory 5 which is the non-volatile memory through a NAND interface 13 such as Toggle or ONFI. The controller 4 may function as a flash translation layer (FTL) configured to perform data management of the NAND flash memory 5 and block management of the NAND flash memory 5. The controller 4 is electrically connected to the DRAM 6.

The data management includes (1) a management of mapping information indicating a correspondence between the logical addresses and the physical addresses of the NAND flash memory 5, and (2) a process for concealing the read and write operations on the page basis and the erasing operation based on the block basis. The logical address is an address used by the host in order to designate the address of the SSD 3. The logical block address (LBA) is typically used as the logical address. In the following description, it is assumed that the logical address is the logical block address (LBA).

The management of the mapping of the logical block addresses (LBAs) and the physical addresses is performed by using a lookup table (LUT) 32 functioning as an address conversion table (more particularly, a logical-to-physical address conversion table). The controller 4 manages the mapping of the LBAs and the physical addresses based on a predetermined management size unit by using the lookup table (LUT) 32. A management size unit is not limited, and may be, for example, 4 kilobytes. The address conversion table (LUT 32) may be loaded into the DRAM 6 from the NAND flash memory 5 when the SSD 3 is powered on, and may be written in the NAND flash memory 5 from the DRAM 6 before the SSD is powered off.

A physical address corresponding to a certain LBA indicates a physical storage position within the NAND flash memory 5 in which the data related to the LBA is written. The physical addresses include physical block addresses and physical page addresses. The physical page addresses are assigned to all pages, and the physical block addresses are assigned to all blocks.

The data writing for the page can be performed one time per one erase cycle. Thus, the controller 4 maps the data writing to the same LBA (also referred to as overwriting) to different pages on the NAND flash memory 5. That is, the controller 4 writes the data designated by a write command (i.e., the write data) received from the host 2 in a page capable of being used next within a block currently allocated as a writing destination block irrespective of the LBA related to the data. The controller 4 updates the LUT 32, and associates the LBA with the physical address of the page in which the data is actually written. If there is no available page in the writing destination block, a new block is allocated as the writing destination block.

The block management includes the management of defective blocks, the wear leveling, and garbage collection.

The host 2 sends a read request (e.g., a read command), a write request (e.g., a write command), and other various requests (or other various commands) to the SSD 3. The read command is a command for requesting that data is to be read from the SSD 3. The read command includes a start LBA of data to be read, and a data length of the data to be read. The write command is a command for requesting that data is to be written in the SSD 3. The write command includes a start LBA of write data and a data length of the write data.

In the present embodiment, position information (for example, LBA) indicating a position in the SSD 3 is referred to as an SSD address. A memory address is an address indicating a position on the DRAM 6. A NAND address is a physical address of the NAND flash memory 5 included in the SSD 3. The SSD 3 converts the SSD address into the NAND address and the NAND address into the SSD address.

Hereinafter, a configuration of the controller 4 will be described.

The controller 4 includes a host interface 11, a central processing unit (CPU) 12, the NAND interface 13, and a DRAM interface 14. The CPU 12, the NAND interface 13, and the DRAM interface 14 are connected to each other through a bus 10. For example, other various processors such as a microprocessor unit (MPU) may be used in place of the CPU.

The host interface 11 receives various commands (for example, a write command, a read command, and an UNMAP/Trim command) from the host 2.

The CPU 12 is a processor configured to control the host interface 11, the NAND interface 13, and the DRAM interface 14. The CPU 12 performs a command process for processing various commands from the host 2 in addition to the FTL process.

The command process includes a write process having data compression function and a read process having a data decompression. The data compression and decompression functions may be performed by the CPU 12, or may be performed by dedicated hardware.

The FTL process and the command process may be controlled by firmware executed in the CPU 12. The firmware causes the CPU 12 to function as a write operation control unit 21 and a read operation control unit 22. The write operation control unit 21 includes a write suppression management unit 21a.

The write operation control unit 21 receives write data from the host 2 along with the reception of the write request from the host 2. The write operation control unit 21 temporarily writes data in a buffer memory 31, and then writes data capable of being written in the NAND flash memory 5, among data items written in the buffer memory 31, in a storage area within the NAND flash memory 5. In the present embodiment, the write operation control unit 21 may write the compressed data in the NAND flash memory 5.

The write suppression management unit 21*a*, as much as possible, writes specific data designated by the host 2 in the buffer memory 31 within the DRAM 6, and suppresses or restricts the writing of the data in the NAND flash memory 5. The lifespan of the NAND flash memory 5 is prolonged by a process performed by the write suppression management unit 21*a*. The details of the control of the write suppression management unit 21*a* will be described below.

When a logical address which is a reading target is designated by a read request from the host 2, the read operation control unit 22 reads data from the buffer memory 31 or the NAND flash memory 5 based on the physical address mapping to the logical address which is the reading target. The read operation control unit 22 returns the data to the host 2 through the host interface 11. In the present embodiment, the read operation control unit 22 may decompress the compressed data, and may return the decompressed data to the host 2 through the host interface 11.

For example, when an unexpected end such as unauthorized power shutdown occurs, the power storage device 15 supplies power to the controller 4, the NAND flash memory 5, and the DRAM 6 for writing necessary data of data items on the DRAM 6 (e.g., data that is necessary to be non-volatilized) into the NAND flash memory 5. The power storage device 15 may be provided in the host 2 or another device. In this case, when the unexpected end occurs, the power storage device supplies power for writing the necessary data of the data items on the DRAM 6 into the NAND flash memory 5, to the SSD 3 from the host 2 or from said another device.

In the present embodiment, the controller 4 determines whether the write command received from the host 2 requests to suppress the use of the NAND flash memory 5 and prompt the use of the DRAM 6, based on any one of the following: a logical address designated by the write command, information indicating that the use of the NAND flash memory 5 is suppressed, and a command type.

When it is determined that the received write command indicates that the use of the NAND flash memory 5 is to be suppressed and the DRAM 6 is to be used, the controller 4 writes the data corresponding to the write command in the DRAM 6, and updates the LUT 32 such that the logical address corresponding to the data and the physical address corresponding to the data on the DRAM 6 map to each other. When the unauthorized power shutdown is detected, the controller 4 writes the data stored in the DRAM 6 into the NAND flash memory 5 based on a power supplied from the power storage device 15, and updates the LUT 32 such that the logical address and the physical address corresponding to the data on the NAND flash memory 5 map to each other.

For example, when the data is written in the DRAM 6, the controller 4 writes not only the data but also the logical address of the data. When the unauthorized power shutdown is detected, the controller 4 updates the LUT 32 based on the logical address stored in the DRAM 6 and the physical address corresponding to the data on the NAND flash memory 5.

When the controller 4 recognizes, by referring to the management table 33, that the write command indicates that the use of the NAND flash memory 5 is to be suppressed and the DRAM 6 is to be used, the controller 4 manages a target area 31*a* on the DRAM 6 in which the data corresponding to the write command is to be written.

When a command for requesting the release of the target area 31*a* is received from the host 2, the controller 4 releases the target area 31*a* without writing the data stored in the target area 31*a* in the NAND flash memory 5.

Hereinafter, a configuration of the host 2 will be described.

The host 2 is an information processing device that executes various programs. The program executed by the information processing device includes application software 41, an operating system (OS) 42, and a file system 43.

As is generally known, the OS 42 is software that is configured to manage the host 2, control hardware within the host 2, and control such that the application software 41 can use the hardware and the SSD 3.

The file system 43 is used for controlling operations (creating, storing, updating, and removing) of a file. For example, ZFS, Btrfs, XFS, ext4, and NTFS may be used as the file system 43. Alternatively, a file object system (for example, Ceph Object Storage Daemon), Key Value Store system (for example, Rocks DB) may be used as the file system 43.

Various pieces of application software 41 run on an application software layer. As an example of the application software 41, there are client software, database software, and a virtual machine.

When it is necessary for the application software 41 to send a request such as the read command or the write command to the SSD 3, the application software 41 sends the request to the OS 42. The OS 42 sends the request to the file system 43. The file system 43 translates the request to a command (e.g., the read command or the write command). The file system 43 sends the command to the SSD 3. When a response from the SSD 3 is received, the file system 43 sends the response to the OS 42. The OS 42 sends the response to the application software 41.

Figure 2:
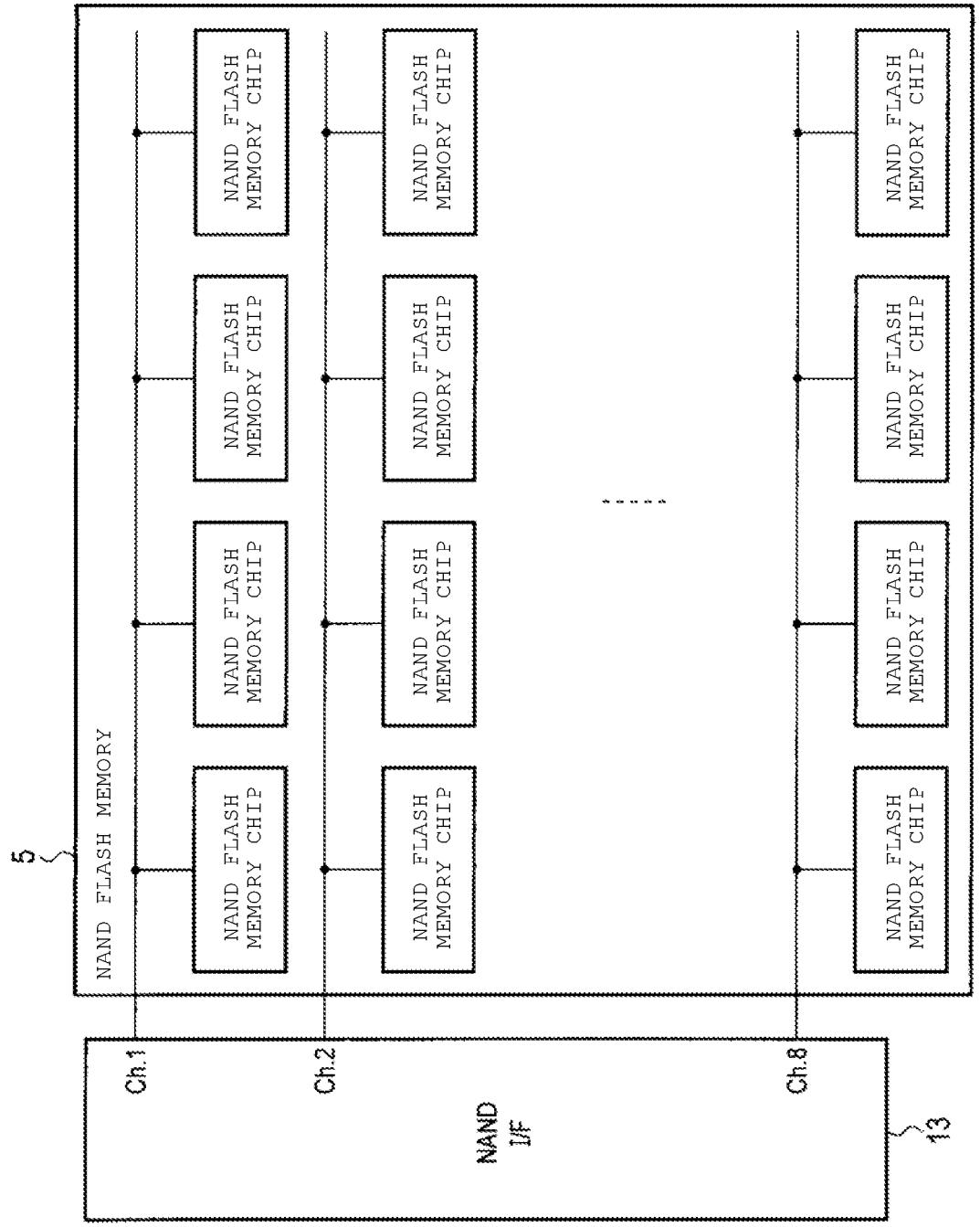
FIG. 2 is a block diagram showing a configuration example of a NAND flash memory according to the first embodiment.

FIG. 2 is a block diagram showing a configuration example of the NAND flash memory 5 according to the present embodiment.

The NAND flash memory 5 is connected to the NAND interface 13 by using communication wires called channels Ch1 to Ch8. A plurality of NAND memory chips is respectively connected to the channels Ch1 to Ch8. Each of the plurality of NAND memory chips includes a plurality of erase blocks.

Hereinafter, the significance of first write suppression management performed by the write suppression management unit 21*a* according to the present embodiment will be described.

The NAND flash memory 5 included in the SSD 3 is non-volatile memory, but has a limited number of write cycles. The NAND flash memory is not able to be used when the write cycles thereof exceed predetermined number of write cycles.

By contrast, the DRAM included in the information processing system 1 such as the DRAM 6 is faster than the NAND flash memory 5 and has less of a limitation on the write cycles than the NAND flash memory, but is a volatile memory.

The information processing system 1 writes the data stored in the DRAM 6 into the NAND flash memory 5 of the SSD 3 such that the data on the DRAM 6 included in the information processing system 1 is not lost. In one embodiment, such writing is triggered by a flush request (more particularly, a cache flush command) received from the host 2. The SSD 3 typically stores the data permanently by writing the data in the NAND flash memory 5.

In addition, for example, in order to cope with the unauthorized power shutdown, the SSD 3, when the power is restored, may perform a process of (1) adjusting the data, which was temporarily written in the NAND flash memory 5 so that the data stored in the DRAM 6 was not to be lost, to be an efficient format, (2) writing the adjusted data into the NAND flash memory 5 again, and (3) deleting the temporarily stored data from the NAND flash memory 5. An example of data on which such a process is performed is a journal of the file system. For example, the journal is data such as a recording or updating history that is semi-automatically stored periodically while a computer or a communication device is being operated.

Among the data items written by the SSD 3, there are many data items to be rewritten through overwriting. For example, a case where a plurality of data items is append-written in the SSD 3 and end position information indicating a position of the last data of the append-written data items is written in the SSD 3, is considered. In such a case, originally, the end position information may be written in the DRAM 6, and the end position information stored in the DRAM 6 may be written into the NAND flash memory 5 when the operation is normally ended. However, in order to cope with the unexpected power shutdown, the end position information may also be written in the NAND flash memory 5 whenever the append-written data is written. When the data is written in a write-once manner, a checksum may be added to the last data of the append-written data items in order to ensure data consistency. In this case, if the data is additionally written, such a case that the written checksum is erased, the append-write of the data is restarted from the erased position, and a new checksum is further written in the last data of the data items to be append-written, is also considered.

However, the end position information and the checksum do not need to be repeatedly written in the NAND flash memory 5, and are merely written so as to be protected for an unexpected end such as the unauthorized power shutdown.

As stated above, in a case where the repeatedly overwritten data is written in the NAND flash memory 5, the lifespan of the storage device having a limited number of write cycles such as the NAND flash memory 5 is shortened.

As described above, although the DRAM 6 is used as the buffer memory or the cache memory, when the writing of the data into the NAND flash memory 5 from the cache memory or the buffer memory is not controlled to be suppressed, temporal data which were not first written in the NAND flash memory 5 is likely to be written in the NAND flash memory 5 at a later time.

Some SSDs include a DRAM having the same storage capacity as that of the NAND flash memory, and a power storage device (e.g., battery or capacitor). In such SSDs, the DRAM typically stores the data, and the data of the DRAM is written in the NAND flash memory by using the power storage device when an unauthorized power shutdown occurs. However, in this method, the storage capacity of the DRAM has to be the same as the storage capacity of the NAND flash memory.

In view of such circumstances, the SSD 3 according to the present embodiment includes the write suppression management unit 21a, and has no requirement that the storage capacity of the NAND flash 5 be equal the storage capacity of the DRAM 6. Accordingly, it is possible to increase the overall capacity of the SSD 3. The writing of the data into the NAND flash memory 5 for coping with the unexpected end such as the unauthorized power shutdown is suppressed, and the lifespan of the NAND flash memory 5 is prevented from being shortened.

Hereinafter, the first write suppression management realized by the write suppression management unit 21a will be described in detail.

The SSD 3 includes the DRAM 6 having predetermined capacity, and the power storage device 15 for writing the data of the DRAM 6 in the NAND flash memory 5 when the unexpected end such as the unauthorized power shutdown occurs.

When all the write data items are temporal data items (for example, journals), the application software 41 requests the SSD 3 to exclusively or preferentially assign all the write data items to the DRAM 6. The first write suppression management is management for assigning the data to the DRAM 6 rather than the NAND flash memory 5 in response to the assignment request, and may be referred to as Rigid Buffer Pinning (RBP). The first write suppression management is to rigidly allocate the data to the buffer memory or the cache memory. The buffer memory or the cache memory to which the data is rigidly allocated by the first write suppression management RBP may be referred to as a Rigid Write-suppression Memory (RWM).

All data items that are managed by the first write suppression management RBP are written in the DRAM 6. When the data items that are managed by the first write suppression management RBP are written in the DRAM 6, the original position information (for example, the LBA of the data) on the SSD 3 is also written in the DRAM 6 in addition to the data. When the unexpected end such as the unauthorized power shutdown occurs, the write suppression management unit 21a writes all the data items stored in the DRAM 6 into the NAND flash memories 5 by using the power of the power storage device 15 based on the SSD addresses stored in the DRAM 6. The updated content of the LUT 32 is written in the NAND flash memory 5.

Whether an area of the buffer memory 31 of the DRAM 6 is used for the first write suppression management RBP may be determined by a range of the position information on the SSD 3 (for example, LBA range). That is, as long as the position information (LBA) is within the designated range, the data items related to the position information may be automatically treated as target data of the first write suppression management RBP.

Alternatively, for each write request, the application software 41 may explicitly instruct whether or not the area is a target to be managed by the first write suppression management RBP. A target area 31a of the first write suppression management RBP in the buffer memory 31 may be divided into a plurality of areas. In this case, identifiers rbp_id are assigned to areas of the target area 31a of the first write suppression management RBP, and the areas are identified by the identifiers.

Even though the application software 41 requests the first write suppression management RBP, when available capacity of the DRAM 6 capable of being used as the target area 31a of the first write suppression management RBP is insufficient, the write suppression management unit 21a sends an error to the application software 41 of the host 2.

The application software 41 may request a notification (optimistic RBP) indicating that the first write suppression management RBP is used if possible. That is, the optimistic RBP is allocation of optimistic data to the buffer memory or the cache memory. When the optimistic RBP is requested, if the available capacity of the DRAM 6 capable of being used as the target area 31a of the first write suppression management RBP is insufficient, even though the data is to be managed by the first write suppression management RBP, the data is not written in the DRAM 6 and is written in the NAND flash memory 5.

The application software 41 may in advance declare the storage capacity of the target area 31a of the first write suppression management RBP in the DRAM 6, and may reserve the target area 31a of the first write suppression management RBP. In the reservation of the target area 31a, the application software 41 may order the SSD 3 to reserve the target area 31a corresponding to the data amount of actual data items to be written. In this case, the write suppression management unit 21a of the SSD 3 may reserve the target area 31a of the storage capacity capable of storing the actual data items and data (for example, LBA) necessary to manage the actual data items.

When the reservation of the target area 31a of the first write suppression management RBP in the DRAM 6 succeeds, if the target area is within a range that does not exceed the declared storage capacity, it is guaranteed that an error caused by insufficiency of the storage capacity of the target area 31a for the first write suppression management RBP in the DRAM 6 does not occur.

The SSD 3 may permit the first write suppression management RBP for the writing of data in a random data position (e.g., a position indicated by the LBA) on the SSD 3, or may permit the first write suppression management RBP within a range of continuous data positions on the SSD 3.

When the SSD 3 permits the writing for which the physical or virtual erase block is designated, a writing destination of data to be written into the NAND flash memory 5 from the buffer memory 31 by the first write suppression management RBP may be a designated erase block. Similarly, when a plurality of erase blocks is grouped as one writing destination area, a writing destination of data to be written into the NAND flash memory 5 from the buffer memory 31 by the first write suppression management RBP may be an area acquired by grouping the plurality of erase blocks.

In this case, the target area 31a of the first write suppression management RBP in the buffer memory 31 may have the same size of an area of one erase block or an area acquired by grouping the plurality of erase blocks, or may be a partial area having a smaller size.

When the writing for which the physical or virtual erase block is designated is permitted, for performing the append-write of data items in the designated area, the SSD 3 may only permit data writing in sequence from a start of the area but not permit random data writing in the area. However, even in such a case, when the write suppression management unit 21a of the SSD 3 uses the first write suppression management RBP, random data writing may be permitted in the target area 31a.

The application software 41 may release the target area 31a of the first write suppression management RBP in the buffer memory 31. In this case, the data stored in the target area 31a of the first write suppression management RBP in the buffer memory 31 may be discarded, and may not written in the NAND flash memory 5.

Before the target area 31a of the first write suppression management RBP in the buffer memory 31 is released, the application software 41 may request that the data stored in the target area 31a of the first write suppression management RBP is to be written into the NAND flash memory 5. Such data may be the entire data stored in the target area 31a, or may be part of the data (for example, a specific range of the LBA) stored in the target area 31a.

Hereinafter, the first write suppression management RBP realized by the write suppression management unit 21a according to the present embodiment will be described in detail with reference to a sequence diagram of FIG. 3 and FIGS. 4 to 12.

Figure 3:
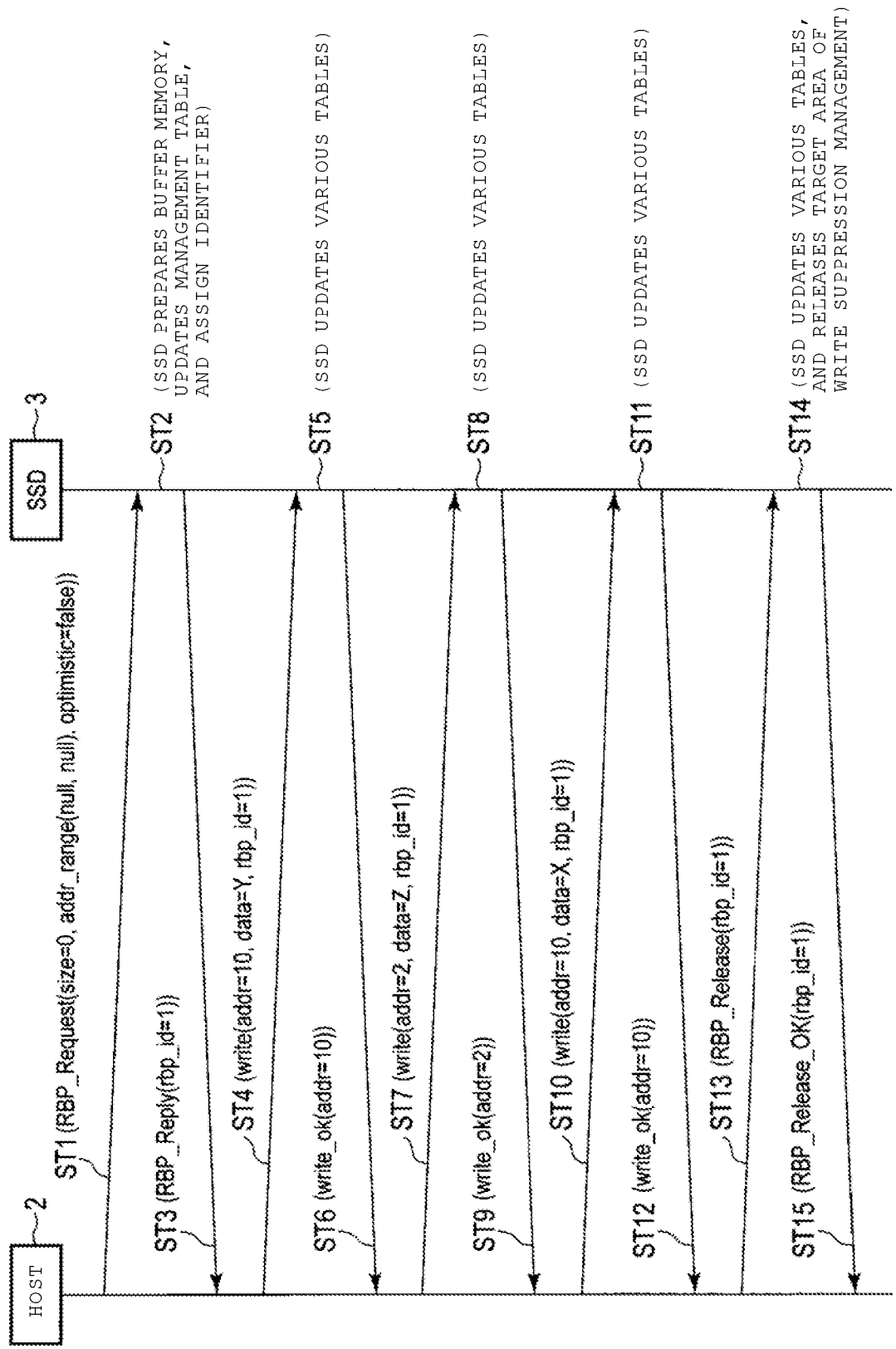
FIG. 3 is a sequence diagram showing an example of a process performed by the information processing system including the memory system according to the first embodiment.

FIG. 3 is a sequence diagram showing an example of a process performed by the information processing system 1 according to the present embodiment. In FIG. 3, the application software 41 requests the use of the first write suppression management RBP without designating the storage capacity of the target area 31a of the first write suppression management RBP in the buffer memory 31. That is, FIG. 3 shows an example in which the application software 41 does not designate a range of the SSD address to which the first write suppression management RBP is applied.

In step ST1, the application software 41 requests the file system 43 to use the first write suppression management RBP through the OS 42. As a result, the file system 43 of the host 2 sends, for example, a request RBP_Request (size=0, addr range(null, null), flag=false) of the first write suppression management RBP to the SSD 3.

In the present embodiment, size indicates a data size of the target area 31a of the first write suppression management RBP to be allocated in the buffer memory 31. size=0 indicates that the target area 31a is used to have a variable length without being reserved. size >0 indicates that the target area 31a is reserved. When a request of the first write suppression management RBP is received, the write suppression management unit 21a of the SSD 3 allocates the target area 31a capable of storing the data designated by size, and manages a buffer pointer for designating the target area 31a, which is to be described below with reference to FIG. 4, by using the management table 33. When the target area 31a is not able to be allocated, the write suppression management unit 21a returns an error to the application software 41 of the host 2 through the file system 43 and the OS 42. When size <0 in the request of the first write suppression management RBP, the write suppression management unit 21a returns an error to the application software 41 of the host 2 through the file system 43 and the OS 42.

addr range(start, end) indicates a range of the SSD address that uses the first write suppression management RBP. start indicates a start of the range of the SSD address. end indicates an end of the range of the SSD address. For example, end may indicate an offset value from start, or may indicate a size of the range of the SSD address. When start and end are "null", the range of the SSD address that uses the first write suppression management RBP is not designated. It is assumed that flag is "true" when the optimistic first write suppression management RBP is to be used and is "false" when the write suppression management unit 21a is to use the first write suppression management RBP. Thus, if the flag is "true", the write suppression management unit 21a uses optimistic RBP.

Figure 4:
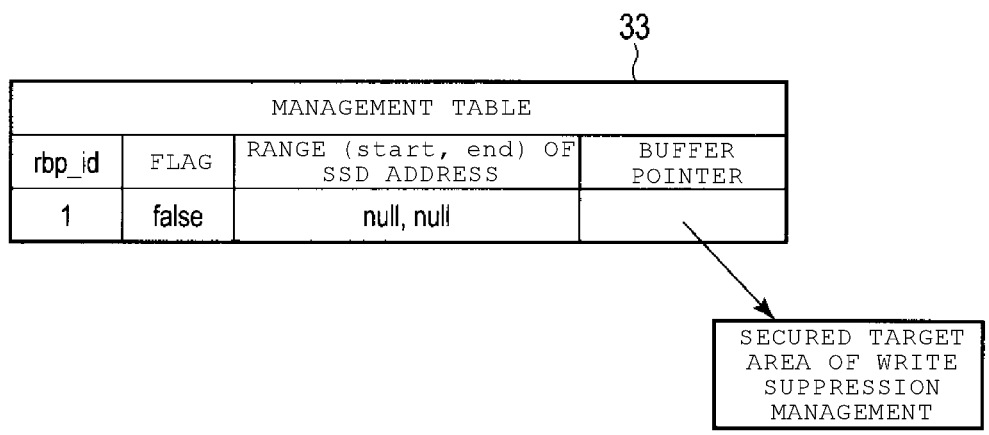
FIG. 4 is a data structure diagram showing an example of a management table according to the first embodiment.

In step ST2, when the request of the first write suppression management RBP is received, the write suppression management unit 21a of the SSD 3 allocates the target area 31a of the first write suppression management RBP in the buffer memory 31, assigns "1" to an identifier rbp_id corresponding to the requested first write suppression management RBP, and writes rbp_id, flag, a range (start, end) of the SSD address that is managed by the first write suppression management RBP, and a buffer pointer indicating the allocated target area 31a of the first write suppression management RBP in the management table 33 as shown in FIG. 4. A case where start=null and end=null in the range of the SSD address in the management table 33 indicates that the range of the SSD address that is managed by the first write suppression management RBP is not designated.

In step ST3, when the updating of the management table 33 succeeds, the write suppression management unit 21a of the SSD 3 sends a reply RBP_Reply(rbp_id=1) including the assigned rbp_id to the application software 41 through the file system 43 and the OS 42.

In step ST4, the application software 41 sends a write request of data "Y" which is a target of the first write suppression management RBP to the file system 43 through the OS 42. As a result, the file system 43 of the host 2 sends a write command Write(addr=10, data=Y, rbp_id=1) that uses the first write suppression management RBP to the SSD 3.

In the present embodiment, addr indicates an SSD address (for example, LBA) of data, data indicates data, and rbp_id indicates an identifier for designating the first write suppression management RBP. As mentioned above, when data that is to be managed by the first write suppression management RBP is written in the SSD 3, the write command designates rbp_id which is an identifier of the first write suppression management RBP.

In step ST5, when a write command that uses the first write suppression management RBP is received, the write suppression management unit 21a of the SSD 3 updates the management table 33 and the LUT 32, and writes the data and the SSD address corresponding to the data in the target area 31a of the first write suppression management RBP.

Figure 5:
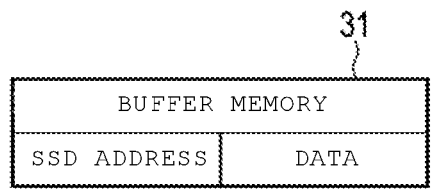
FIG. 5 is a diagram showing an example of a storing state of data in a buffer memory according to the first embodiment.

FIG. 5 shows an example of a storing state of data in the buffer memory 31. The buffer memory 31 stores the SSD address and the data corresponding to the SSD address.

Figure 6:
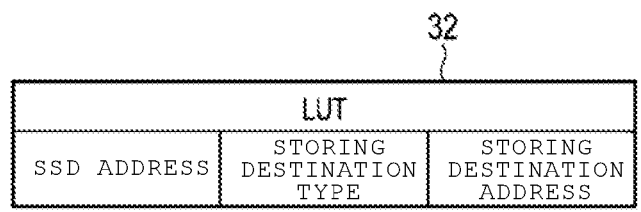
FIG. 6 is a data structure diagram showing an example of a lookup table according to the first embodiment.

FIG. 6 is a data structure diagram showing an example of the LUT 32. The LUT 32 manages an SSD address, a storing destination type of the data corresponding to the SSD address, and a storing destination address. The storing destination type designates whether the data is stored in the NAND flash memory 5 or is stored in the DRAM 6. The storing destination address indicates a memory address when the storing destination type is the DRAM 6, and indicates a NAND address when the storing destination type is the NAND flash memory 5. "null" of the LUT 32 indicates a state in which the data is not stored.

Figure 7:
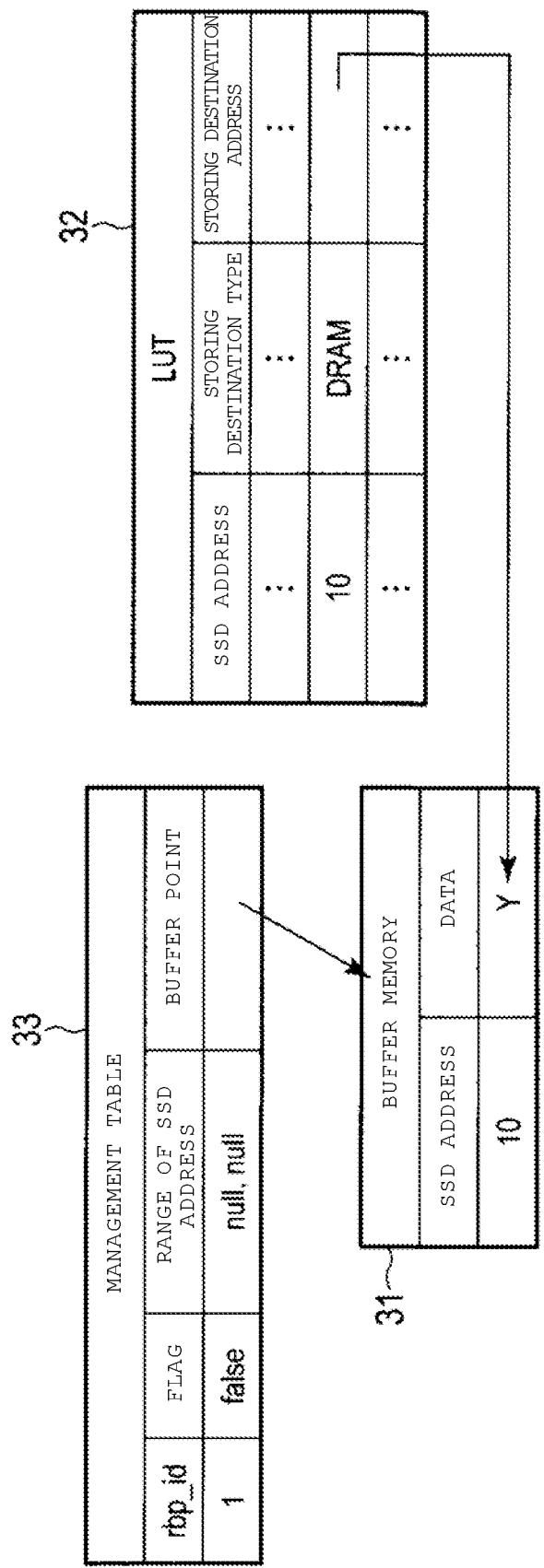
FIG. 7 is a diagram showing states of a management table, a lookup table, and a buffer memory after a write command Write(addr=10, data=Y, rbp_id=1) is received.

For example, when the write command Write (addr=10, data=Y, rbp_id=1) is received, since rbp_id is "1" as shown in FIG. 7, the write suppression management unit 21a of the SSD 3 writes an SSD address "10" and the data "Y" in the target area 31a indicated by the buffer pointer corresponding to rbp_id "1". Since the data "Y" of the SSD address "10" is present on the DRAM 6, the write suppression management unit 21a records the storing destination type corresponding to the SSD address "10" as "DRAM" indicating the DRAM 6, and records the storing destination address corresponding to the SSD address "10" as the memory address of the data "Y" on the DRAM 6, in the LUT 32.

In step ST6, when the writing of the data "Y" and the updating of the management table 33 and the LUT 32 succeed, the write suppression management unit 21a of the SSD 3 sends a write completion Write_ok(addr=10) including the SSD address "10" to the host 2. The application software 41 of the host 2 receives the write completion Write_ok(addr=10) through the file system 43 and the OS 42.

In step ST7, the application software 41 sends a write request of data "Z" which is a target of the first write suppression management RBP to the file system 43 through the OS 42. As a result, the file system 43 of the host 2 sends, for example, a write command Write (addr=2, data=Z, rbp_id=1) that uses the first write suppression management RBP to the SSD 3.

Figure 8:
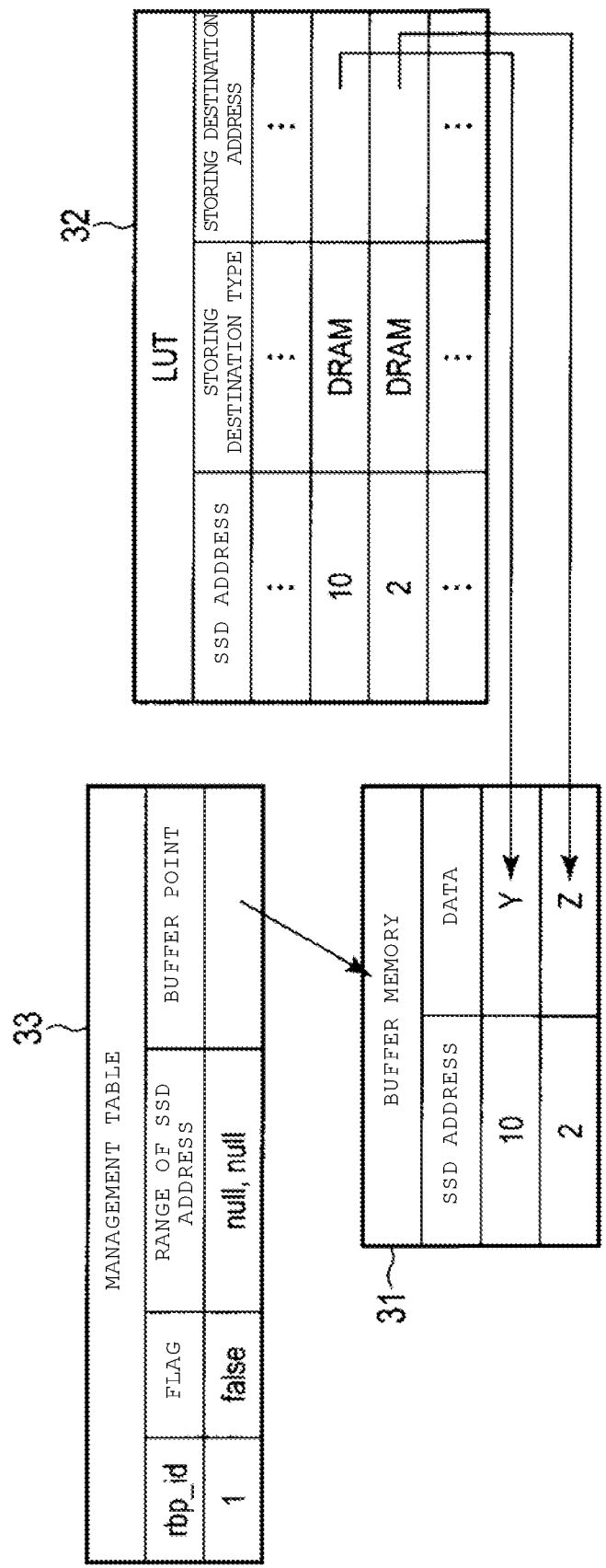
FIG. 8 is a diagram showing states of a management table, a lookup table, and a buffer memory after a write command Write(addr=2, data=Z, rbp_id=1) is received.

In step ST8, the write suppression management unit 21a of the SSD 3 receives the write command Write(addr=2, data=Z, rbp_id=1). In this case, an SSD address "2" is not stored yet in the target area 31a of the first write suppression management RBP. Accordingly, the write suppression management unit 21a adds a tuple in the target area 31a indicated by the buffer pointer corresponding to rbp_id "1", and writes the SSD address "2" and the data "Z", as shown in FIG. 8. Since the data "Z" of the SSD address "2" is present on the DRAM 6 for the LUT 32, the write suppression management unit 21a uses the storing destination type corresponding to the SSD address "2" as "DRAM", and uses the storing destination address corresponding to the SSD address "2" as the memory address of the data "Z" on the DRAM 6.

In step ST9, when the writing of the data "Z" and the updating of the management table 33 and the LUT 32 succeed, the write suppression management unit 21a of the SSD 3 sends a write completion Write_ok(addr=2) including the SSD address "2" to the host 2. The application software 41 of the host 2 receives the write completion Write_ok (addr=2) through the file system 43 and the OS 42.

In step ST10, the application software 41 sends a write request of data "X" which is a target of the first write suppression management RBP to the file system 43 through the OS 42. As a result, the file system 43 of the host 2 sends, for example, a write command Write (addr=10, data=X, rbp_id=1) that uses the first write suppression management RBP to the SSD 3.

Figure 9:
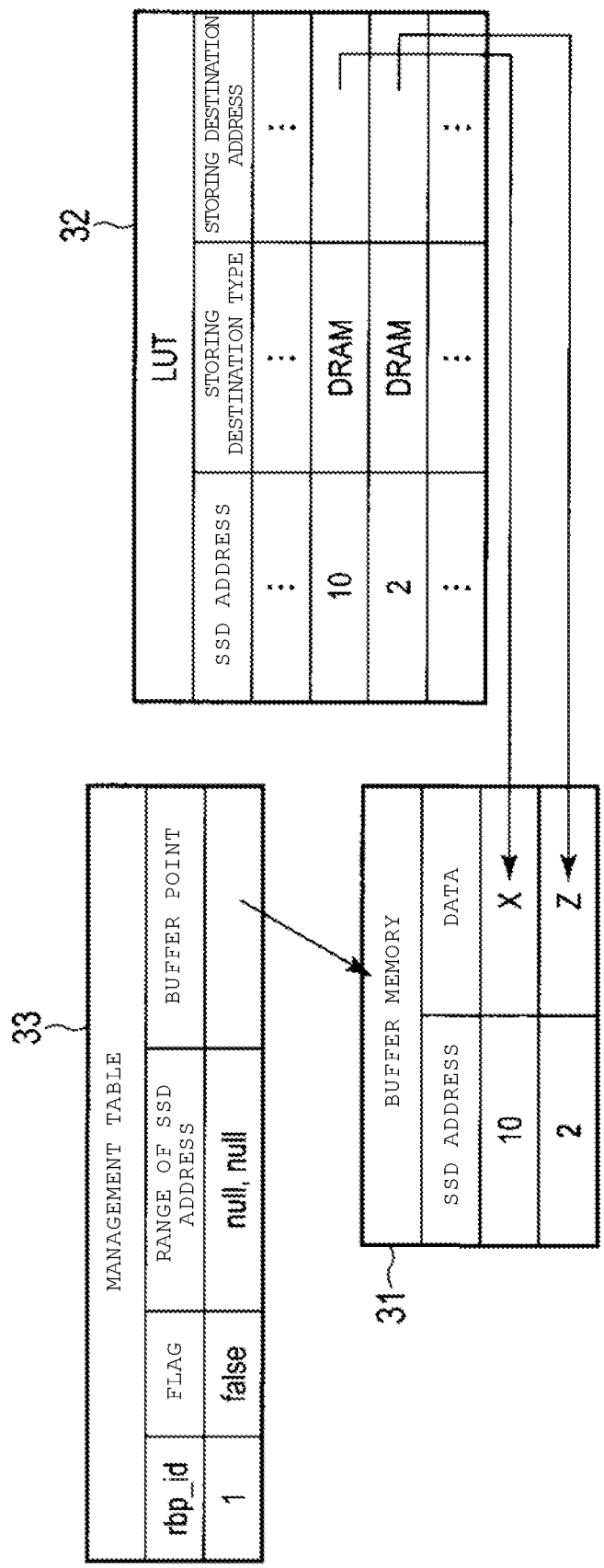
FIG. 9 is a diagram showing states of a management table, a lookup table, and a buffer memory after a write command Write(addr=10, data=X, rbp_id=1) is received.

In step ST11, the write suppression management unit 21a of the SSD 3 receives the write command Write (addr=10, data=X, rbp_id=1). In this case, the SSD address "10" is an SSD address in which the writing is performed in the target area 31a of the first write suppression management RBP in the past. Accordingly, the write suppression management unit 21a updates the data "Y" corresponding to the SSD address "10" to the data "X" without adding a tuple in the target area 31a indicated by the buffer pointer corresponding to rbp_id "1", as shown in FIG. 9.

In step ST12, when the writing of the data "X" and the updating of the management table 33 and the LUT 32 succeeds, the write suppression management unit 21a of the SSD 3 sends a write completion Write_ok(addr=10) including the SSD address "10" to the host 2. The application software 41 of the host 2 receives the write completion Write_ok(addr=10) through the file system 43 and the OS 42.

In step ST13, when the target data items "X" and "Z" of the first write suppression management RBP become no longer necessary, the application software 41 sends a release request of the first write suppression management RBP of which rbp_id is "1" to the file system 43 through the OS 42. As a result, the file system 43 of the host 2 sends, for example, a release command RBP_Release(rbp_id=1) for releasing the first write suppression management RBP to the SSD 3.

Figure 10:
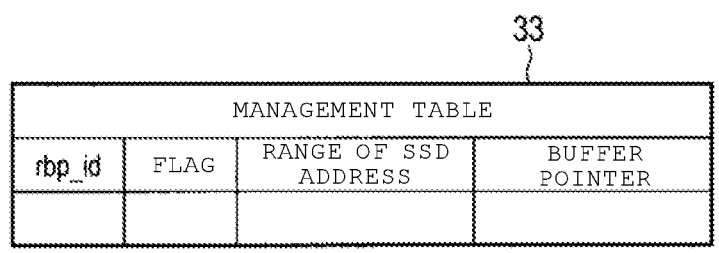
FIG. 10 is a diagram showing a state of a management table after a release command RBP_Release(rbp_id=1) is received.
Figure 11:
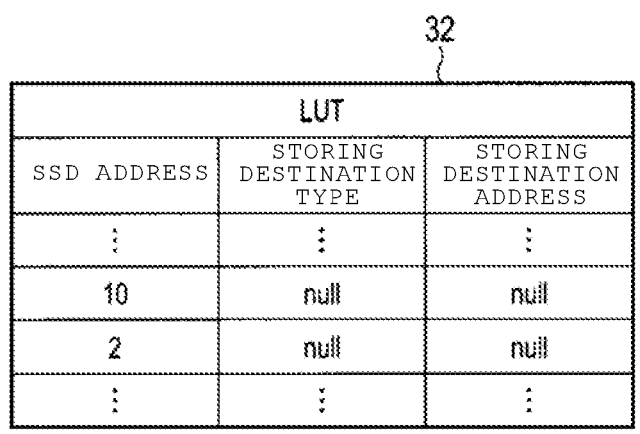
FIG. 11 is a diagram showing a state of a lookup table after a release command RBP_Release(rbp_id=1) is received.

In step ST14, the write suppression management unit 21a of the SSD 3 receives the release command RBP_Release (rbp_id=1). In so doing, the write suppression management unit 21a refers to the management table 33, removes all the SSD addresses and the data items stored in the target area 31a corresponding to the identifier "1" on the DRAM 6 (sets the target area not to store any data), and releases the target area 31a. As shown in FIG. 10, the write suppression management unit 21a removes the tuple corresponding to the identifier "1" from the management table 33. As shown in FIG. 11, the write suppression management unit 21a sets the storing destination types and the storing destination addresses of the SSD addresses "10" and "2" corresponding to the released target area 31a to be "null".

In step ST15, when the releasing of the target area 31a of the first write suppression management RBP succeeds, the write suppression management unit 21a of the SSD 3 sends a release completion Release ok (rbp_id=1) including rbp_id "1" to the host 2. The application software 41 of the host 2 receives the release completion Release ok (rbp_id=1) through the file system 43 and the OS 42.

In the present embodiment, the application software 41 may allocate the target area 31a for the first write suppression management RBP within an available area of the DRAM 6, and may write the data in the target area 31a. In the first write suppression management RBP, the data having the SSD address stored in the SSD 3 in the past and the data having the SSD address designated later are stored in the same memory address. In the first write suppression management RBP, the data having the SSD address without being stored in the past is stored in a new position of the allocated target area 31a which is not used yet.

In the first write suppression management RBP, when data having a size which exceeds the storage capacity of the target area 31a is stored in the allocated target area 31a, a new target area may be allocated. When a new target area is not allocated, an error may occur when the flag is "false", and the data may be typically stored in the SSD 3 without using the first write suppression management RBP when the flag is "true".

In the present embodiment, even though the identifier of the first write suppression management RBP is not designated for the write command, when the range of the SSD address designated by the application software 41 belongs to the target area 31a of the first write suppression management RBP, the first write suppression management RBP is used for the write command. Specifically, the command that uses the first write suppression management RBP is, for example, RBP_Request(size=16, addr range (100, 16), flag=false), since the write command Write(addr=101, data=Y) does not include the identifier rbp_id of the first write suppression management RBP but an SSD address "101" is located in the range addr range (100, 16) of the SSD address of the first write suppression management RBP, the write suppression management unit 21a uses the first write suppression management RBP for this write command, and writes the data "Y" in the target area 31a. Meanwhile, since an SSD address "117" is not located in the range addr range (100, 16) of the SSD address of the first write suppression management RBP in a write command Write (addr=117, data=Z), the write suppression management unit 21a writes the data "Z" in the SSD 3 according to the typical process.

In the present embodiment, various addresses such as the SSD address, the memory address, and the NAND address are not limited to be simply numbers, and may have a data structure. For example, the storing destination of the SSD 3 may be designated by a channel, a NAND memory chip, an erase block, or a page offset.

Hereinafter, a process when the write suppression management unit 21a according to the present embodiment detects an unauthorized power shutdown will be described with reference to FIG. 12.

When the unauthorized power shutdown is detected, the write suppression management unit 21a writes the data stored in the target area 31a into the NAND flash memory 5. The write suppression management unit 21a updates the LUT 32 as if the host 2 writes the data in the SSD address at the time of writing. That is, after the unauthorized power shutdown is detected, the write suppression management unit 21a updates the LUT 32 such that the logical address and the physical address of the NAND flash memory 5 are associated with the data moved to the NAND flash memory 5 from the target area 31a. Accordingly, the controller 4 correctly recognizes that the data is present on the NAND flash memory 5 by referring to the LUT 32.

For example, in step ST9 of FIG. 3, that is, after a write command Write(addr=2, data=Z, rbp_id=1) is sent to the SSD 3 from the application software 41 and a write completion Write_ok (addr=2) is sent to the application software 41 from the SSD 3, it is assumed that the unauthorized power shutdown occurs and then the power is restored.

Figure 12:
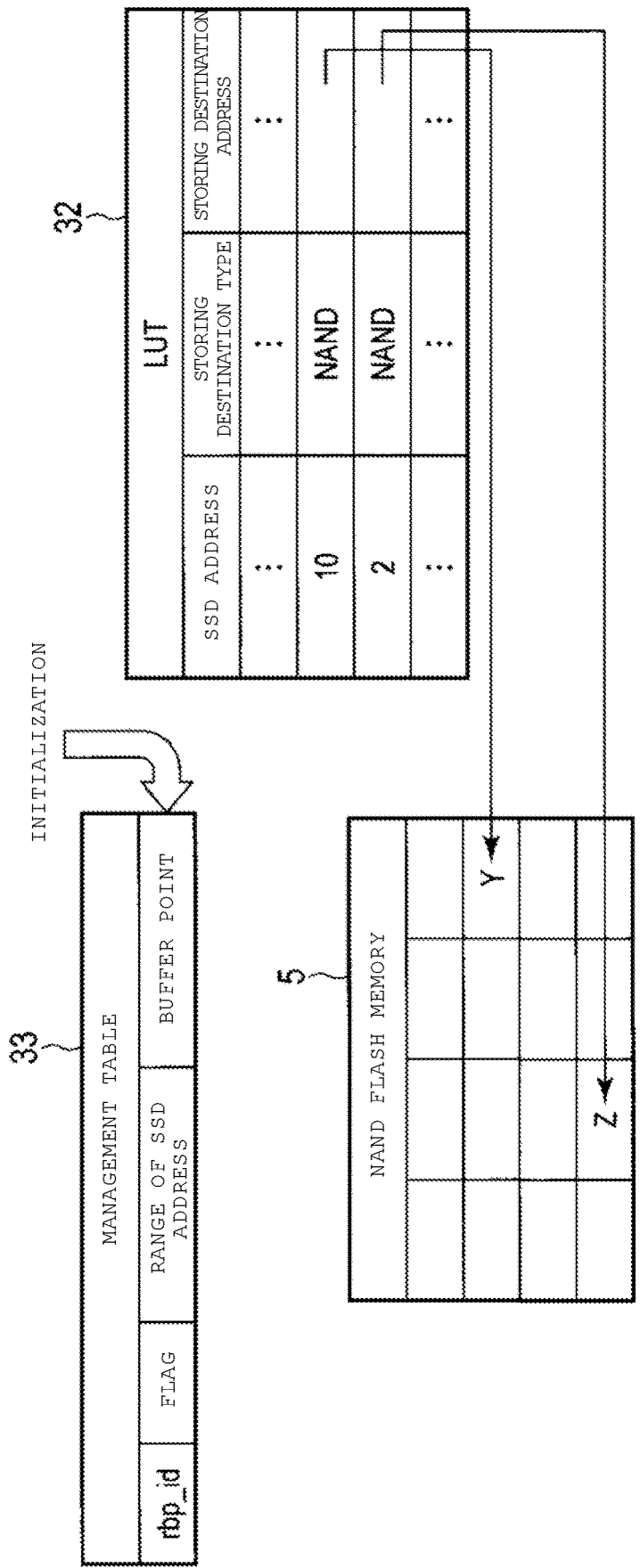
FIG. 12 is a diagram showing states of a management table, a lookup table, and a NAND flash memory when unauthorized power shutdown is detected.

FIG. 12 is a diagram showing the relationship between the management table 33, the LUT 32, and the NAND flash memory 5 after the power is restored.

The management table 33 is initialized. When the unauthorized power shutdown occurs, the data items "Y" and "Z" stored in the target area 31a are written into the NAND flash memory 5. The LUT 32 associates the SSD address of the data "Y", the storing destination type "NAND" indicating the NAND flash memory 5, and the storing destination address, and manages the associated information items. The LUT associates the SSD address of the data "Z", the storing destination type "NAND", and the storing destination address, and manages the associated information items.

In the present embodiment described above, the host 2 may suppress the writing of repeatedly rewritten data or data temporarily stored to cope with the unexpected end such as the unauthorized power shutdown into the NAND flash memory 5, and the lifespan of the NAND flash memory 5 included in the SSD 3 may be prolonged.

In the present embodiment, since the DRAM 6 is faster than the NAND flash memory 5, the host 2 may accelerate the writing control of repeatedly rewritten data or data temporarily stored to cope with the unexpected end such as the unauthorized power shutdown, and may accelerate the process of the host 2.

Second Embodiment

In the present embodiment, a modification example of the first embodiment will be described. In the present embodiment, the write suppression management unit 21a performs second write suppression management.

In the first embodiment, the target area 31a of the first write suppression management RBP in the buffer memory 31 is rigidly allocated when necessary, and is released when not necessary. In contrast, in the present embodiment, an area of the buffer memory 31 that stores data which is not permitted to be written into the NAND flash memory 5 is automatically switched according to the management of the write suppression management unit 21a.

In the present embodiment, the controller 4 can cause data, which is present within a predetermined range (rewritable window), among a data group append-written in the DRAM 6, to be rewritten on the DRAM 6 in sequence from the latest write data. When the data stored in the DRAM 6 is out of the rewritable window, the controller 4 writes this data into the NAND flash memory 5.

The controller 4 may receive a command for designating a start position of the rewritable window and a size of the rewritable window from the host 2.

For example, the controller 4 manages a size of the predetermined range and a position of the latest write data of the append-written data group by using management table 33A.

The controller 4 may maintain a storing area of the data on the DRAM 6 when the data stored in the DRAM 6 is written into the NAND flash memory 5 but this data is not able to be read from the NAND flash memory 5, and may release the storing area of the data on the DRAM 6 when the data is able to be read from the NAND flash memory 5.

Figure 13:
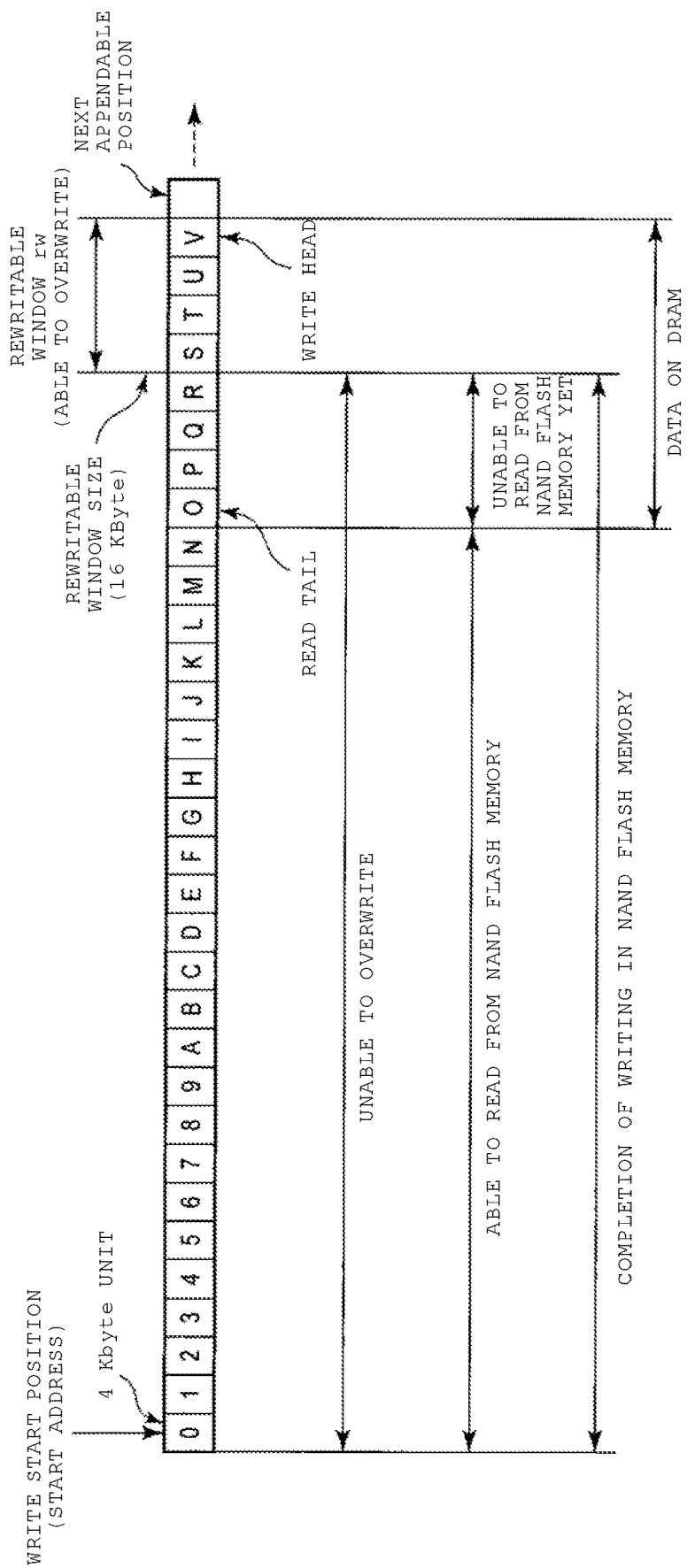
FIG. 13 is a diagram for describing a rewritable window used in second write suppression management realized by a write suppression management unit according to a second embodiment.

FIG. 13 is a diagram for describing the rewritable window to be used in the second write suppression management realized by the write suppression management unit 21*a* according to the present embodiment.

For example, the application software 41 requests that data is to be append-written. For example, in the append-write of the data, the last data may be repeatedly updated. In the second write suppression management according to the present embodiment, the data items are efficiently written even when the data items are append-written and the updating of the last data is repeated. In the write suppression management according to the present embodiment, a rewritable window rw having a predetermined size which is moved according to the writing performed in continuous positions is allocated, and the last data of the append-written data items is exclusively assigned to the rewritable window rw in the buffer memory 31. The second write suppression management in which the last data of the append-written data items is exclusively assigned to the rewritable window rw may be referred to as Append Buffer Pinning (ABP). The second write suppression management ABP movably allocates the data in the buffer memory or the cache memory. The buffer memory or the cache memory to which the data is movably allocated by the second write suppression management ABP may be referred to as Appendable Write-suppression Memory (AWM).

When the second write suppression management ABP is requested, the application software 41 designates position information (for example, LBA) indicating a write start position on the SSD 3 and size of the rewritable window rw used in the second write suppression management ABP in the buffer memory 31.

In the writing using the second write suppression management ABP, it is possible to write (overwrite) data in any position any number of times as long as the area falls within a range from a write head to a write start position by the rewritable window size. In FIG. 13, the area present within the range from the write head to the write start position by the rewritable window size is equivalent to the rewritable window rw.

An initial value of the write head is a value acquired by adding the rewritable window size to the write start position.

In the writing using the second write suppression management ABP, the writing out of the range of the rewritable window rw is not permitted except for one exceptional position. The one exceptional position is a position which is out of the range of the rewritable window rw and is adjacent to the write head. In the present embodiment, the exceptional position indicates a next appendable position.

In the writing using the second write suppression management ABP, all data related to valid write requests are written in the DRAM 6. When necessary, the write suppression management unit 21*a* newly allocates the target area 31*a* of the second write suppression management ABP for the writing using the second write suppression management ABP in the DRAM 6, and exclusively uses the target area 31*a* for the second write suppression management ABP.

In the second write suppression management ABP, when the writing is performed in the next appendable position, the write head is moved to a last position of the writing. That is, the rewritable window rw is shifted (is moved) by one write unit. The data stored out of the rewritable window rw is written into the NAND flash memory 5. The area out of the rewritable window rw is not able to be updated (overwritten).

In the present embodiment, it is assumed that even though the data is written in the NAND flash memory 5, this written data is not able to be immediately read from the NAND flash memory 5, and is able to be read from the NAND flash memory 5 after a predetermined time elapses. In the second write suppression management ABP, when data out of the rewritable window rw is written into the NAND flash memory 5 and the data is able to be read from the NAND flash memory 5, the storing area of the data on the DRAM 6 is able to be released from the exclusive use for the second write suppression management ABP. The write suppression management unit 21*a* may check whether or not the data written in the NAND flash memory 5 is able to be read from the NAND flash memory 5 by actually reading the data from the NAND flash memory 5. The write suppression management unit 21*a* may in advance determine a readable condition (a condition such as a time after writing, a write amount, or a write pattern), and may determine whether or not the data written in the NAND flash memory 5 is able to be read from the NAND flash memory 5 depending on whether or not the condition is satisfied.

The write head indicates a latest write position on the DRAM 6 in the writing using the second write suppression management ABP.

A read tail indicates a position of data in which the data is able to be read from the NAND flash memory 5 next, among data items which were written in the NAND flash memory 5 since they are out of the rewritable window rw but are not able to be read from the NAND flash memory 5 yet.

When the SSD 3 permits the writing for which the physical or virtual erase block is designated, the data storing destination may be the designated erase block in the second write suppression management ABP.

When the SSD 3 groups the plurality of erase blocks as one storing destination area and permits the writing for which the group of the plurality of erase blocks is designated, the data storing destination may be the designated group of the plurality of erase blocks in the second write suppression management ABP.

When the second write suppression management ABP is associated with the physical or virtual erase block or the group of the plurality of erase blocks, the second write suppression management ABP may permit or may not permit the writing out of the physical or virtual erase block or the end of the group of the plurality of erase blocks.

When the writing out of the associated range in the second write suppression management ABP is permitted, the process may be continued in the second write suppression management ABP by implicitly allocating a new physical or virtual erase block or the group of the plurality of erase blocks to the second write suppression management ABP.

When the writing out of the associated range in the second write suppression management ABP is not permitted, the writing out of the associated range is recognized as an error in the second write suppression management ABP.

The application software 41 may release the rewritable window rw of the second write suppression management ABP in the buffer memory 31. In this case, the data stored in the rewritable window rw in the buffer memory 31 is discarded, and is not written into the NAND flash memory 5.

The application software 41 may request that the data stored in the rewritable window rw be written into the NAND flash memory 5 before the rewritable window rw of the buffer memory 31 is released. Before the rewritable window rw is released, the application software 41 may use all the data items of the rewritable window rw as the data written in the NAND flash memory 5 or may limit the data written in the NAND flash memory 5 to a part of (for example, a specific range from the start of the rewritable window rw) of the data items of the rewritable window rw.

When the unexpected end such as the unauthorized power shutdown occurs, the write suppression management unit 21a writes all the data items stored in the DRAM 6 into the NAND flash memory 5 according to the SSD addresses stored in the DRAM 6 and updates the LUT 32 after the data items stored in the DRAM 6 are written into the NAND flash memory 5 by using the power of the power storage device 15.

Hereinafter, the second write suppression management ABP realized by the write suppression management unit 21a according to the present embodiment will be described in detail with reference to FIGS. 14 to 19.

Initially, the application software 41 requests that the file system 43 use the second write suppression management ABP through the OS 42. As a result, the file system 43 of the host 2 sends, for example, a request ABP_Request (start_addr=1000, rewritable_window_size=4) of the second write suppression management ABP to the SSD 3.

In the present embodiment, start_addr indicates an SSD address indicating a write start position. rewritable_window_ size indicates a value of the rewritable window size. It is assumed that one unit of the rewritable window size is the same as one unit of a range indicated by start_addr. For example, in the SSD 3 of which the SSD address is equivalent to the LBA in 4 kilobytes, when the rewritable window size is described as "1", the actual size of the rewritable window is 4 kilobytes.

Subsequently, when a request ABP_Request(start_addr=1000, rewritable_window_size=4) of the second write suppression management ABP is received, the write suppression management unit 21a of the SSD 3 allocates the target area 31a of the second write suppression management ABP on the DRAM 6 which has the designated rewritable window size and a size in which a necessary read-only buffer area is able to be sufficiently accommodated. In the present embodiment, the memory address of the allocated target area 31a is managed as the buffer pointer indicating the target area 31a. The allocated target area 31a may be in a list format or may be in a format such as a ring buffer.

The write suppression management unit 21a returns an error to the host 2 when the target area 31a is not able to be allocated. The application software 41 of the host 2 receives the error through the file system 43 and the OS 42.

When the target area 31a is able to be allocated, the write suppression management unit 21a assigns "1" to an identifier abp_id corresponding to the requested second write suppression management ABP, and writes "1" as the identifier abp_id, "1000" as a start address start_addr, "4" as the rewritable window size rewritable_window_size, a write head wh, a read tail rt, and a buffer pointer in the management table 33A, as shown in FIG. 14. For example, the buffer pointer may be the first memory address of the allocated target area 31a.

The write head wh indicates a current write head by using an offset value from the start address. An initial value of the write head wh is start_addr+rewritable_window_size−1. For example, the write suppression management unit 21a performs a process of multiplying a unit of the SSD address such as 4 kilobytes (4096 bytes) when an actual position on the DRAM 6 is calculated.

The read tail rt indicates a current read tail by using an offset value from the start address. An initial value of the read tail rt is zero.

When the updating of the management table 33A succeeds, the write suppression management unit 21a of the SSD 3 sends a reply ABP_Reply(abp_id=1) including the assigned identifier abp_id to the host 2. The application software 41 of the host 2 receives the reply ABP_Reply (abp_id=1) through the file system 43 and the OS 42.

Subsequently, the application software 41 sends a notification indicating that data items "A", "B", "C", "D", "E", "F", "G", "H", "I", and "J" are written in the SSD addresses in sequence from the SSD address "1000" to the SSD 3 through the OS 42 and the file system 43. It is assumed that each size of the data items "A", "B", "C", "D", "E", "F", "G", "H", "I", and "J" is 4 kilobytes.

Figure 15:
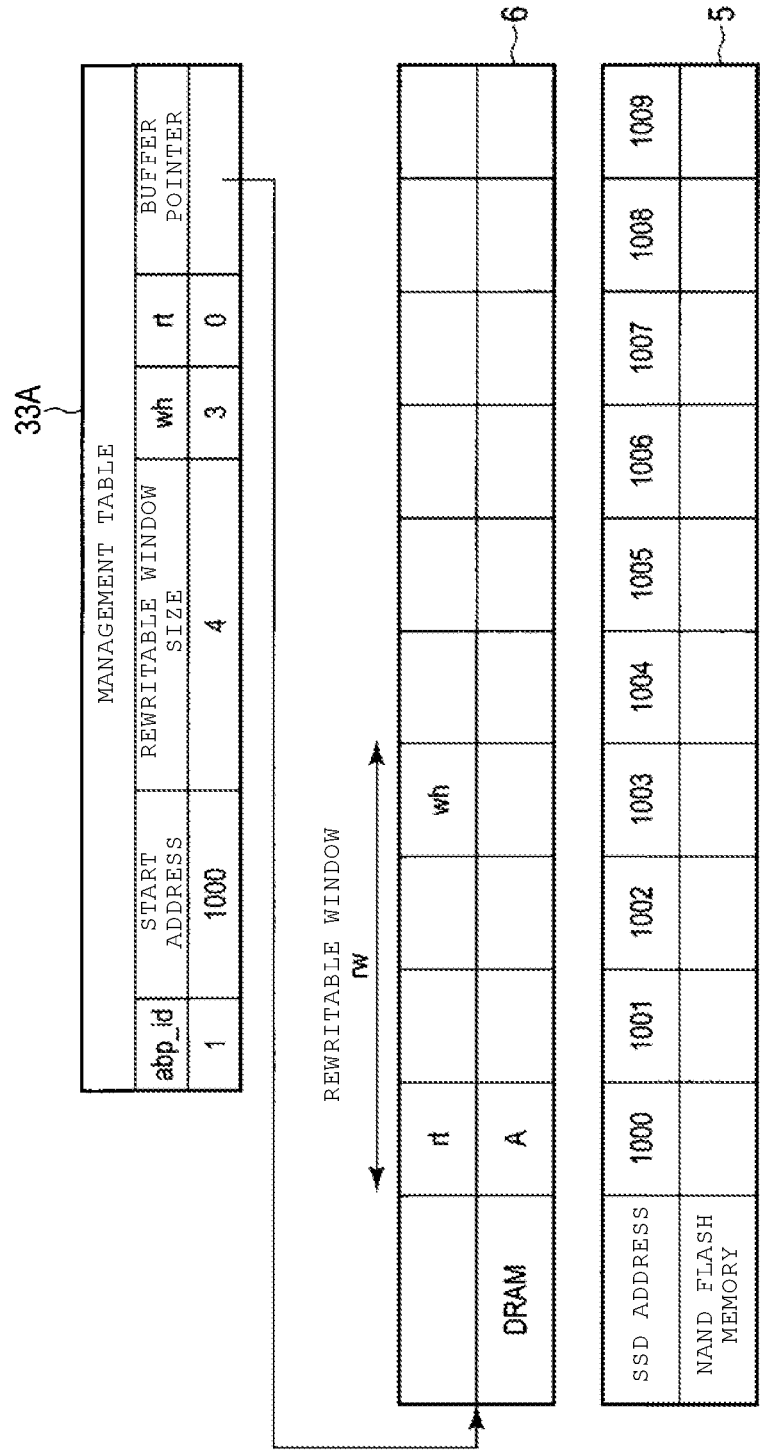
FIG. 15 is a diagram showing a first state of the relationship between a management table, a dynamic random-access memory (DRAM), and a NAND flash memory according to the second embodiment.

FIG. 15 is a diagram showing the relationship between the management table 33A, the DRAM 6, and the NAND flash memory 5 when the data "A" of which the SSD address is "1000" is written in the DRAM 6.

Since the writing of the data "A" is performed within the range of the rewritable window rw, the write suppression management unit 21a writes the data "Ts." only in the DRAM 6.

Figure 16:
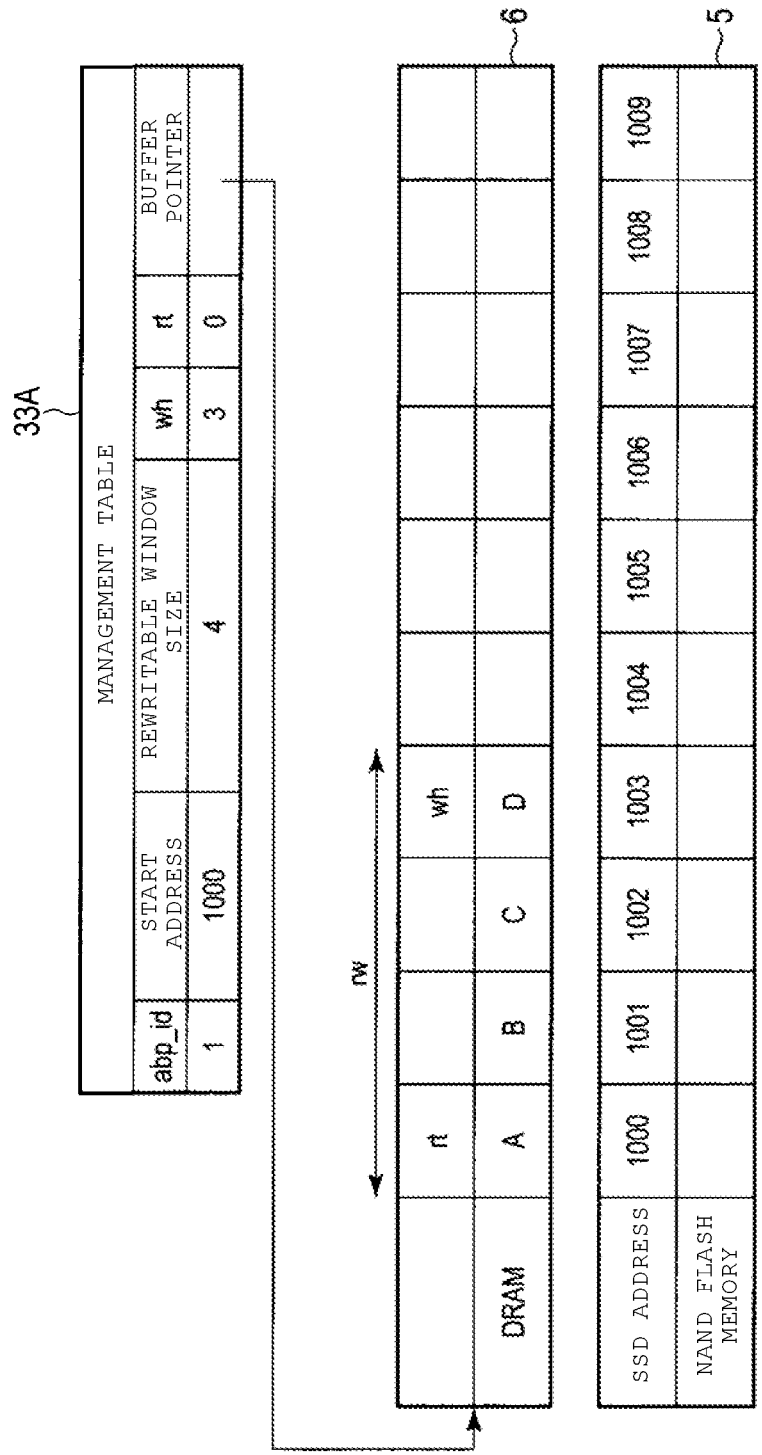
FIG. 16 is a diagram showing a second state of the relationship between the management table, the dynamic random-access memory (DRAM), and the NAND flash memory according to the second embodiment.

FIG. 16 is a diagram showing the relationship between the management table 33A, the DRAM 6, and the NAND flash memory 5 when the data "A" to "D" of which the SSD addresses are "1000" to "1003" are written in the DRAM 6.

Since the writing of the data "A" to "D" is performed within the range of the rewritable window rw, the write suppression management unit 21a writes the data "A" to the data "D" only in the DRAM 6.

In the state of FIG. 16, the write suppression management unit 21a may update any data from the data "A" to the data "D" stored within the range of the rewritable window rw on the DRAM 6.

In the state of FIG. 16, it is assumed that the writing of the data "E" of which the SSD address is "1004" is further performed. In this case, the writing of the data "E" in the DRAM 6 is performed out of the range of the rewritable window rw of FIG. 16. However, a position of the DRAM 6 in which the data "E" is written is the same as "wh+1" which is a next addable position, the data "E" is written in the next addable position of the DRAM 6.

Figure 17:
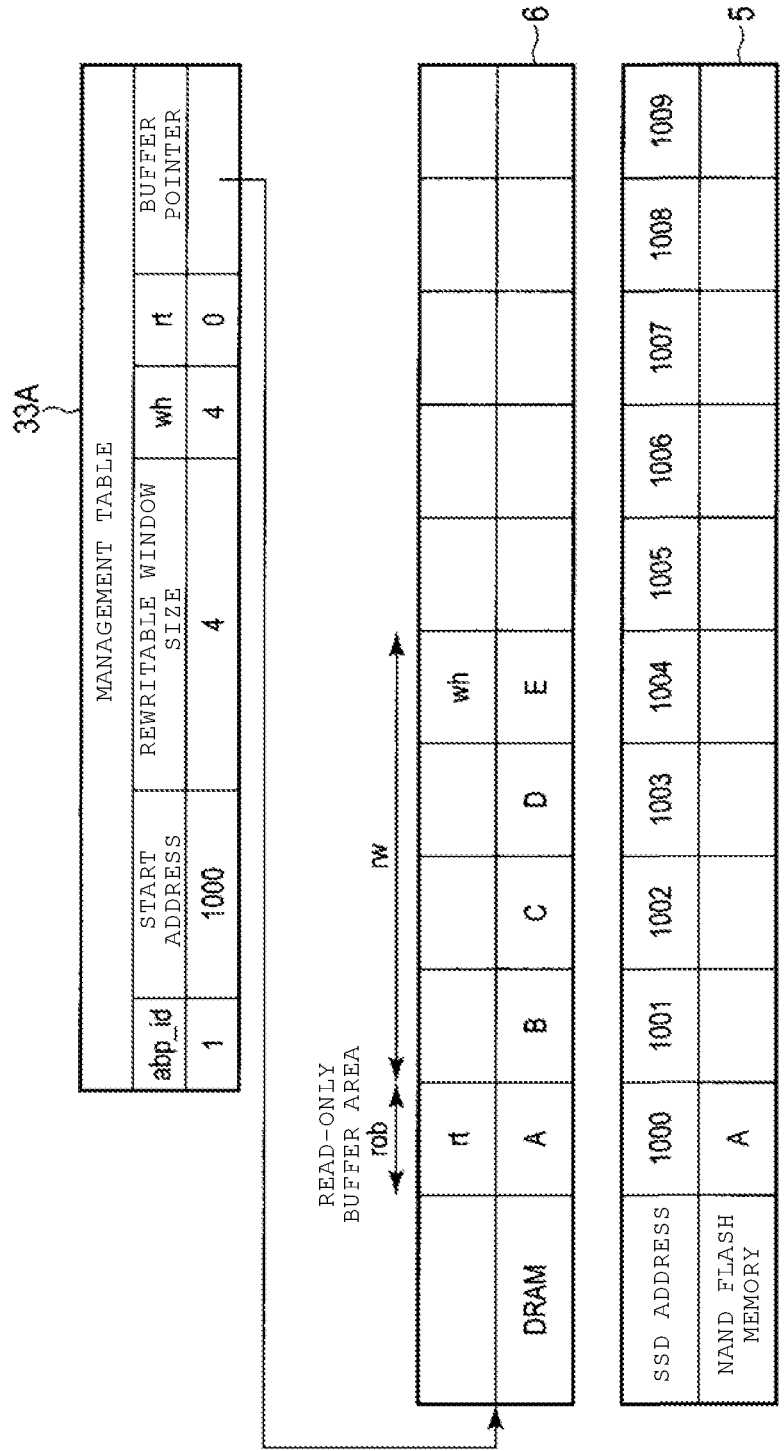
FIG. 17 is a diagram showing a third state of the relationship between the management table, the dynamic random-access memory (DRAM), and the NAND flash memory according to the second embodiment.

FIG. 17 is a diagram showing the relationship between the management table 33A, the DRAM 6, and the NAND flash memory 5 when the data "E" of which the SSD address is "1004" is written in the DRAM 6.

In FIG. 17, since the data "E" is written in the next addable position of FIG. 16, the write head wh is further moved by one unit than that in the case of FIG. 16. Accordingly, the position of the rewritable window rw of FIG. 17 is deviated from the position of the rewritable window rw of FIG. 16 toward a position in which the writing is newly performed by one unit.

Due to the movement of the rewritable window rw, the position of the data "A" on the DRAM 6 is out of the rewritable window rw. In so doing, the write suppression management unit 21a writes the data "A" out of the rewritable window rw into the NAND flash memory 5.

While the data "A" written in the NAND flash memory 5 is not able to be read from the NAND flash memory 5 yet, the write suppression management unit 21a does not move the read tail rt, and does not release the position on the DRAM 6 in which the data "A" is stored, by using the position as a read-only buffer area "rob".

Figure 18:
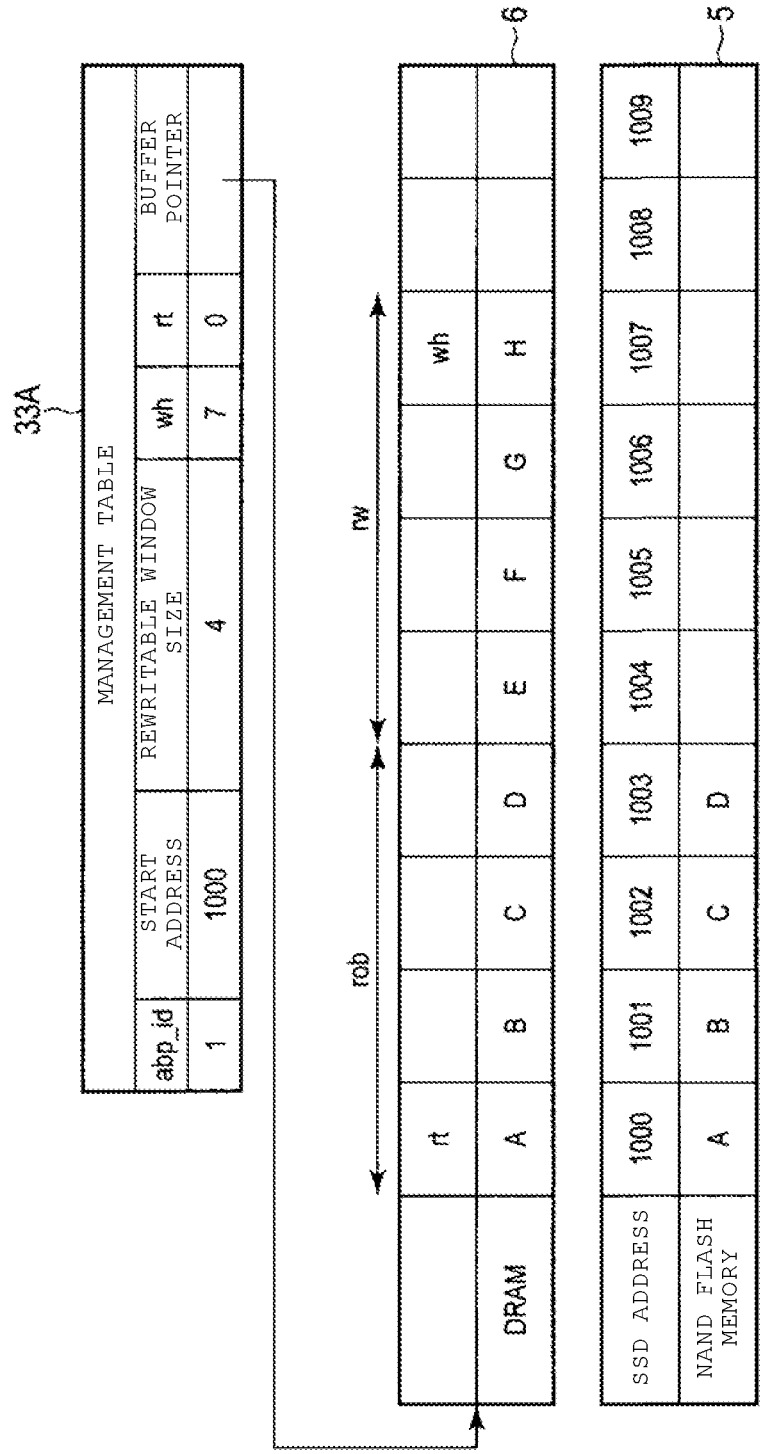
FIG. 18 is a diagram showing a fourth state of the relationship between the management table, the dynamic random-access memory (DRAM), and the NAND flash memory according to the second embodiment.

FIG. 18 is a diagram showing the relationship between the management table 33A, the DRAM 6, and the NAND flash memory 5 when the data "F" to "H" of which the SSD addresses are "1005" to "1007" is written in the DRAM 6.

The write suppression management unit 21a writes the data items "F", "G", and "H" in the DRAM 6, moves the write head wh in the order of writing, and writes the data items "B", "C", and "D" on the DRAM 6 out of the rewritable window rw into the NAND flash memory 5. While the data items "A", "B", "C", and "D" are not able to be read from the NAND flash memory 5 yet, the write suppression management unit 21a does not move the read tail rt, and the read-only buffer area "rob" on the DRAM 6 is widened. The write suppression management unit 21a does not release the storing areas of the data items "A", "B", "C", and "D" on the DRAM 6.

Figure 19:
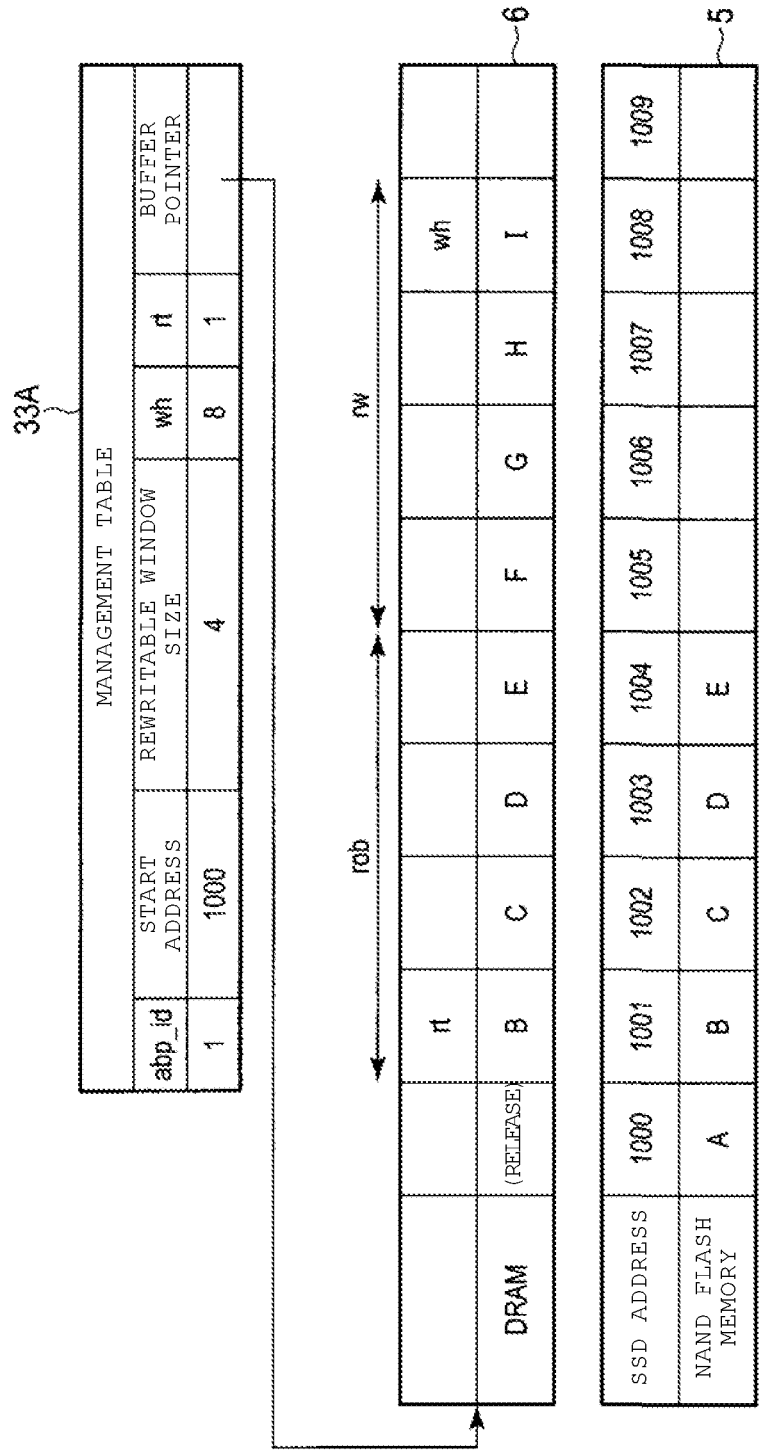
FIG. 19 is a diagram showing a fifth state of the relationship between the management table, the dynamic random-access memory (DRAM), and the NAND flash memory according to the second embodiment.

FIG. 19 is a diagram showing the relationship between the management table 33A, the DRAM 6, and the NAND flash memory 5 when the data "I" of which the SSD address is "1008" is written in the DRAM 6.

The write suppression management unit 21a writes the data "I" in the DRAM 6, moves the write head wh, and writes the data "E" stored in the DRAM 6 into the NAND flash memory 5. In the present embodiment, it is assumed that the data "A" is able to be read from the NAND flash memory 5. In this case, the write suppression management unit 21a moves the read tail rt, and the write suppression management unit 21a releases the storing area of the data "A" on the DRAM 6.

In the present embodiment described above, the writing of the data in the DRAM 6 is preferentially performed and the writing of the data in the NAND flash memory 5 is suppressed similarly to the case of the first embodiment. Accordingly, it is possible to accelerate the write operation of the SSD 3, and it is possible to prolong the lifespan of the NAND flash memory 5 by preventing the unnecessary writing of data into the NAND flash memory 5.

Figure 20:
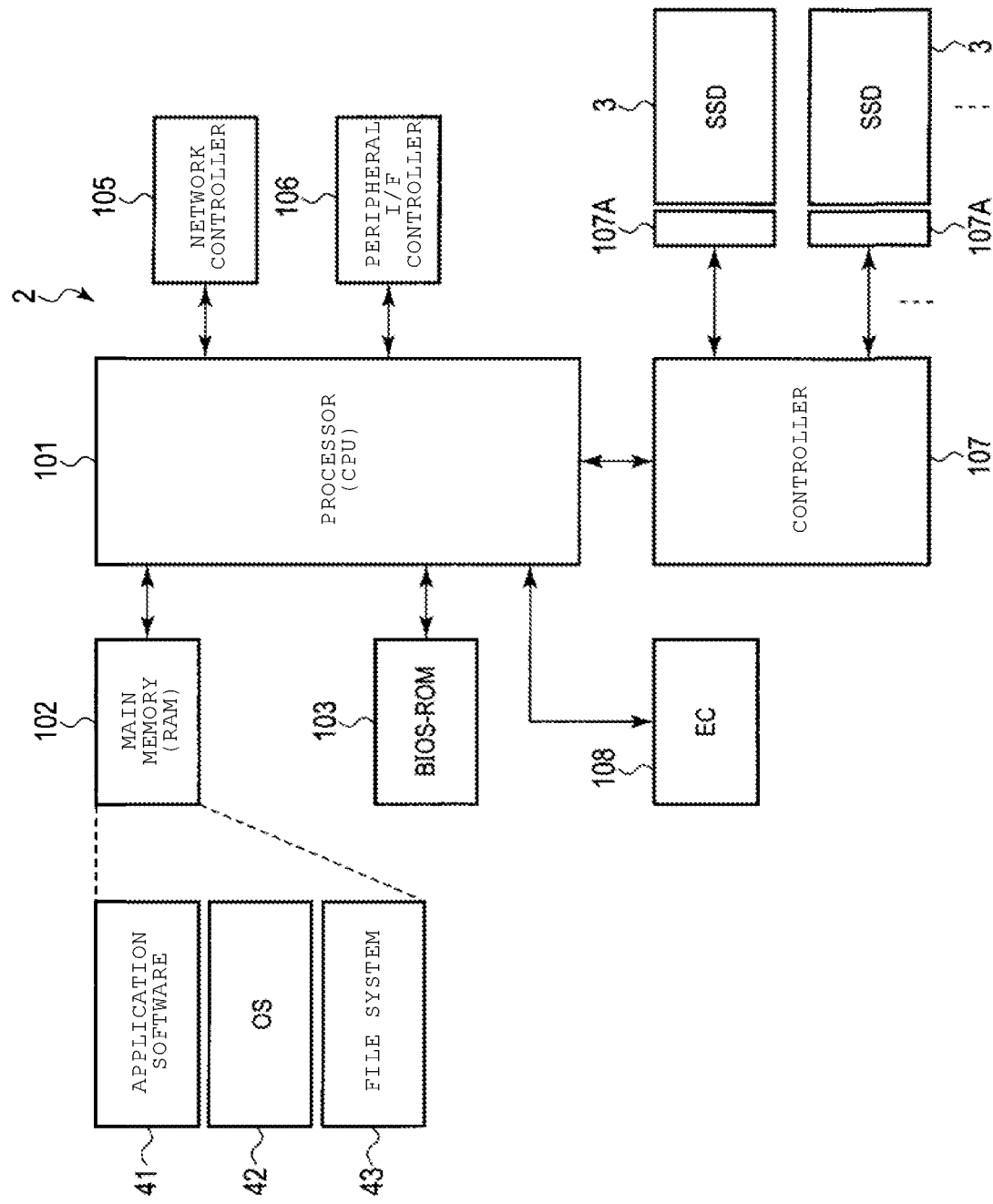
FIG. 20 is a block diagram showing an example of a hardware configuration of an information processing device functioning as a host.

FIG. 20 is a block diagram showing an example of a hardware configuration of the information processing device (e.g., computing device) functioning as the host 2 according to the respective embodiments.

The information processing device is realized as a computing device such as a server (for example, storage server). The information processing device includes a processor (CPU) 101, a main memory 102, a BIOS-ROM 103, a network controller 105, a peripheral interface controller 106, a controller 107, and an embedded controller (EC) 108.

The processor 101 is a CPU configured to control operations of components of the information processing device. The processor 101 executes various programs loaded to the main memory 102 from any one of the plurality of SSDs 3. The main memory 102 is a random-access memory such as a DRAM. The program executed by the processor 101 includes the application software 41, the OS 42, and the file system 43. A program executed by the processor 101 may include an I/O management module 44. The I/O management module 44 sends a data I/O request (e.g., write request and a read request) to the SSD 3 for every minimum data length described above or for every data length which is an integer multiple of the minimum data length. The I/O management module 44 may be included in the application software 41, or may be included in the OS 42 or the file system 43.

The I/O management module 44 performs data management by using an LBA space of the SSD 3.

The processor 101 executes a basic input and output system (BIOS) stored in the BIOS-ROM 103 which is non-volatile memory. BIOS is a system program for hardware control.

The network controller 105 is a communication device such as a wired LAN controller or a wireless LAN controller. The peripheral interface controller 106 is configured to communicate with a peripheral device such as a USB device.

The controller 107 is configured to communicate with devices connected to a plurality of connectors 107A. In the present embodiment, the plurality of SSDs 3 is connected to the plurality of connectors 107A, respectively. The controller 107 is an SAS expander, a PCIe switch, a PCIe expander, a flash array controller, or a RAID controller.

The EC 108 functions as a system controller configured to perform power management of the information processing device. The EC 108 turns on and turns off the information processing device in response to an operation of the power switch by a user. The EC 108 is realized as a processing circuit such as a one-chip microcontroller. The EC 108 may include a keyboard controller that controls an input device such as a keyboard (KB).

Figure 21:
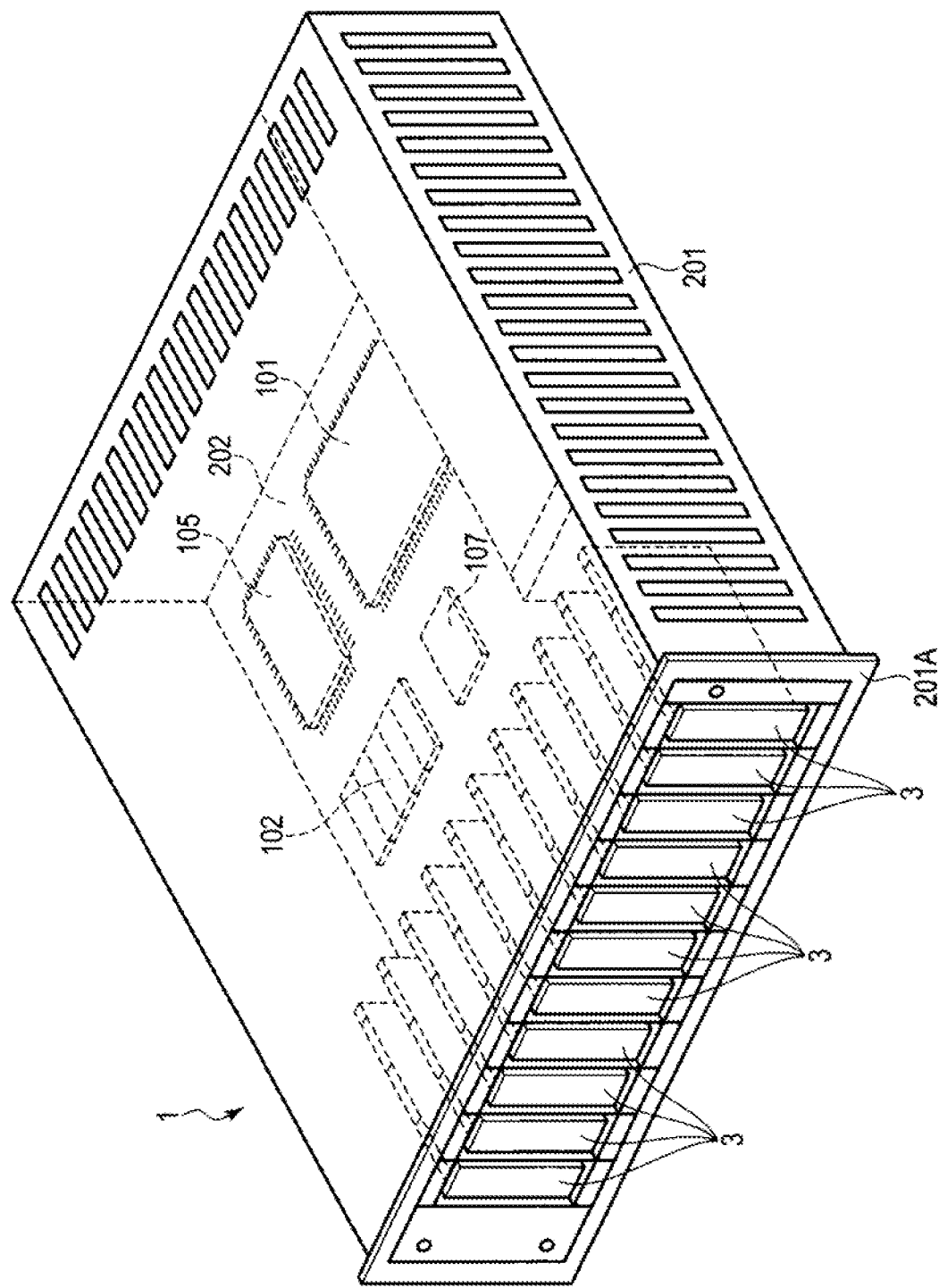
FIG. 21 is a perspective view showing a configuration example of the information processing device including a plurality of SSDs and the host.

FIG. 21 is a perspective view showing a configuration example of the information processing device including the plurality of SSDs 3 and the host 2 according to the respective embodiments.

The information processing device includes a thin box-shaped casing 201 capable of being accommodated in a rack. The plurality of SSDs 3 may be arranged within the casing 201. In this case, each SSD 3 may be detachably inserted into a slot provided in a front surface 201A of the casing 201.

A system board (e.g., motherboard) 202 is disposed within the casing 201. Various electronic components including the CPU 101, the memory 102, the network controller 105, and the controller 107 are mounted on the system board 202. These electronic components function as the host 2.

In the respective embodiments, the NAND flash memory is used as the example of the non-volatile memory. However, the function of the present embodiment may be applied to other various non-volatile memories such as an MRAM, a phase change random access memory (PRAM), a resistive random access memory (ReRAM), and a ferroelectric random access memory (FeRAM).

In the respective embodiments, table format data may have another data structure such as a hash table structure, a tree structure, and a list structure.

In the respective embodiments, the application software 41 sends various requests to the file system 43 through the OS 42, and the file system 43 sends the commands corresponding to various requests to the SSD 3. However, all other pieces of software run on the application software 41, the OS 42, and the host 2 may generate various commands.

In the respective embodiments, the application software 41 receives various completion notifications from the SSD 3 through the file system 43 and the OS 42. However, the completion notification may be received by the file system 43 or the OS 42. The application software 41 may receive the completion notification without passing through at least one of the file system 43 and the OS 42.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a non-volatile memory;
   a buffer memory; and
   a controller configured to:
   allocate a target area in the buffer memory for storing data that are to be kept in the buffer memory and not be written into the non-volatile memory until a non-volatilization event occurs, the non-volatilization event being one of a flush request from the host and a detection of a power shutdown;
   write first data corresponding to a first write command received from a host into the target area in the buffer memory, responsive to the first write command, which is received with an indication from the host to write the first data in the target area in the buffer memory; and
   write second data corresponding to a second write command received from the host into an area in the buffer memory that is not allocated as the target area, responsive to the second write command, which is received with no indication from the host to write the second data into the target area in the buffer memory.

2. The memory system according to claim 1, wherein the controller is further configured to manage mapping of logical addresses and physical addresses, wherein
   when the first data is stored in the buffer memory, the controller updates the mapping such that a first logical address corresponding to the first data is mapped to a physical address of the buffer memory at which the first data is stored, and
   after the non-volatilization event occurs, the controller writes the first data stored in the buffer memory into the non-volatile memory and updates the mapping such that the first logical address is mapped to a physical address of the non-volatile memory at which the first data is stored.

3. The memory system according to claim 1, wherein the controller determines that the first write command received from the host indicates that the first data is to be written into the target area in the buffer memory, based on one of a first logical address designated by the write command, information indicating that use of the non-volatile memory is to be suppressed, and a command type.

4. The memory system according to claim 3, wherein the controller returns an error to the host in a case where an available space of the target area in the buffer memory is not enough to keep the first data therein.

5. The memory system according to claim 1, wherein the controller is configured to:
   associate the first data with a first logical address designated by the first write command, and
   write the associated information items in a region of a volatile memory, which has another region allocated as the buffer memory.

6. The memory system according to claim 1, wherein the controller releases the target area without writing the data stored in the target area into the non-volatile memory when a command for requesting that the target area be released is received from the host.

7. The memory system according to claim 1, wherein
   the controller is further configured to manage an area in the buffer memory to store data therein for append-write, wherein the data for the append-write in the buffer memory corresponds to data that is within a predetermined range from a last written append-write position, and
   the non-volatilization event further occurs when a size of data for the append-write stored in the buffer memory exceeds a first threshold value.

8. The memory system according to claim 7, wherein the controller determines the first threshold value based on a command from the host.

9. The memory system according to claim 7, wherein the controller keeps the data for the append-write in the buffer memory for a period of time after the data is written into the non-volatile memory.

10. The memory system according to claim 9, wherein the controller releases a storage area for the data for the append-write in the buffer memory after the controller confirms that the data is readable from the non-volatile memory.

11. The memory system according to claim 7, wherein the controller is further configured to:
    determine whether or not the data for the append-write is within a predetermined range from the last written append-write position,
    maintain the data in the buffer memory when the data is within the predetermined range, and
    write the data into the non-volatile memory when the data is outside of the predetermined range.

12. The memory system according to claim 11, wherein the controller manages the latest append-write position and a size of the predetermined range using a management table.

13. The memory system according to claim 11,
    wherein the controller determines a start position of the predetermined range and a size of the predetermined range based on a command from the host.

14. In a memory system including a buffer memory and a non-volatile memory, a method of performing writes to the non-volatile memory, said method comprising:
    allocating a target area in the buffer memory for storing data that are to be kept in the buffer memory and not be written into the non-volatile memory until a non-volatilization event occurs, the non-volatilization event being one of a flush request from the host and a detection of a power shutdown;
    writing first data corresponding to a first write command received from a host into the target area in the buffer memory, responsive to the first write command, which is received with an indication from the host to write the first data in the target area in the buffer memory; and
    writing second data corresponding to a second write command received from the host into an area in the buffer memory that is not allocated as the target area, responsive to the second write command, which is received with no indication from the host to write the second data into the target area in the buffer memory.

15. The method according to claim 14, further comprising:
    determining that the first write command received from the host indicates that the first data is to be written into the target area in the buffer memory, based on one of a first logical address designated by the write command, information indicating that use of the non-volatile memory is to be suppressed, and a command type.

16. The method according to claim 14, further comprising:
associating the first data with a first logical address designated by the first write command; and
writing the associated information items in a region of a volatile memory, which has another region allocated as the buffer memory.

17. The method according to claim 14, further comprising:
in response to a command received from the host for requesting that the target area be released, releasing the target area without writing the data stored in the target area into the non-volatile memory.

18. The method according to claim 14, further comprising:
managing an area in the buffer memory to store data therein for an append-write, wherein the data for the append-write in the buffer memory corresponds to data that is within a predetermined range from a last written append-write position.

* * * * *